United States Patent
Yang et al.

(10) Patent No.: US 11,595,237 B1
(45) Date of Patent: Feb. 28, 2023

(54) PEAK REDUCTION TONE ALLOCATION

(71) Applicant: QUALCOMM Incorporated, San Diego, CA (US)

(72) Inventors: Wei Yang, San Diego, CA (US); Saeid Sahraei, San Diego, CA (US); Gokul Sridharan, Sunnyvale, CA (US); Yi Huang, San Diego, CA (US); Hung Dinh Ly, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/736,075

(22) Filed: May 3, 2022

(51) Int. Cl.
*H04L 27/26* (2006.01)

(52) U.S. Cl.
CPC .............. *H04L 27/2621* (2013.01)

(58) Field of Classification Search
CPC ............ H04L 27/2601; H04L 27/2614; H04L 27/2618; H04L 27/2621; H04L 27/2623; H04L 27/2624
See application file for complete search history.

(56) References Cited

U.S. PATENT DOCUMENTS

| | | | | |
|---|---|---|---|---|
| 5,815,531 A * | 9/1998 | Dent | ................ | H04L 25/03292 375/297 |
| 7,720,175 B2 * | 5/2010 | Yeon | ................... | H04L 27/2624 375/296 |
| 7,860,194 B2 * | 12/2010 | Kim | ................... | H04L 1/0066 714/780 |
| 7,991,091 B2 * | 8/2011 | Suzuki | ............... | H04L 27/2605 375/348 |
| 8,406,323 B2 * | 3/2013 | Huang | ............. | H04L 27/26522 375/299 |
| 8,879,679 B2 * | 11/2014 | Quanbeck | ........... | H04L 27/2671 375/152 |
| 8,891,662 B2 * | 11/2014 | Jeong | .................... | H04L 5/0051 375/232 |
| 8,995,568 B1 * | 3/2015 | Wu | ........................ | H04K 1/006 375/295 |
| 9,088,319 B2 * | 7/2015 | Peng | ..................... | H03F 1/3241 |
| 9,191,080 B2 * | 11/2015 | Yokomakura | ........ | H04B 7/0413 |
| 9,313,063 B1 * | 4/2016 | Jia | ...................... | H04L 25/03006 |
| 9,391,818 B1 * | 7/2016 | Rao | ..................... | H04J 13/0059 |
| 9,544,171 B2 * | 1/2017 | Berardinelli | ........ | H04L 27/2607 |
| 9,571,322 B2 * | 2/2017 | Bae | ..................... | H04L 27/2627 |
| 9,780,985 B1 * | 10/2017 | Tom | ...................... | H04L 5/0007 |
| 9,813,276 B2 * | 11/2017 | Jungnickel | ........ | H04L 27/26526 |
| 9,876,657 B1 * | 1/2018 | Jeon | ..................... | H04B 7/0452 |

(Continued)

*Primary Examiner* — James M Perez
(74) *Attorney, Agent, or Firm* — Haynes and Boone, LLP

(57) ABSTRACT

A user equipment for wireless communications includes a memory configured to store a peak reduction tone (PRT) table and a processor configured to retrieve a plurality of PRT sequences from the PRT table. The plurality of PRT sequences includes a first PRT sequence based upon a first data rate and a second PRT sequence based upon a second data rate. The second data rate is larger than the first data rate, and the second PRT sequence is a subset of the first PRT sequence. The user equipment also includes a power amplifier operable to transmit data with the first PRT sequence according to the first data rate or with the second PRT sequence according to the second data rate.

21 Claims, 11 Drawing Sheets

(56) References Cited

U.S. PATENT DOCUMENTS

| | | | |
|---|---|---|---|
| 9,942,011 B2* | 4/2018 | Tang | H04L 25/03834 |
| 10,284,407 B2* | 5/2019 | Bala | H04L 27/2605 |
| 10,340,987 B2* | 7/2019 | McCallister | H04B 17/336 |
| 10,644,916 B1* | 5/2020 | Shattil | H04B 7/0697 |
| 10,651,972 B2* | 5/2020 | Wang | H04L 1/0041 |
| 10,764,102 B2* | 9/2020 | Sahin | H04B 1/7085 |
| 10,771,297 B2* | 9/2020 | Lin | H04L 27/26 |
| 10,873,345 B2* | 12/2020 | Yang | H03M 13/1137 |
| 10,931,318 B2* | 2/2021 | Mahmood | H04B 1/04 |
| 10,985,958 B2* | 4/2021 | Sahin | H04L 5/0007 |
| 11,201,775 B2* | 12/2021 | Lopez | H04B 5/0031 |
| 11,329,853 B2* | 5/2022 | Sahraei | H04L 27/262 |
| 11,356,312 B2* | 6/2022 | Nadal | H04L 27/2605 |
| 11,418,422 B1* | 8/2022 | Dabbagh | H04L 25/0262 |
| 11,424,973 B2* | 8/2022 | Sahraei | H04L 27/2615 |
| 11,451,425 B2* | 9/2022 | Sridharan | H04W 72/0453 |
| 11,516,058 B2* | 11/2022 | Mukkavilli | H04L 27/2618 |
| 2003/0142754 A1* | 7/2003 | Jung | H04L 27/2614 375/260 |
| 2003/0202460 A1* | 10/2003 | Jung | H04L 27/2621 370/480 |
| 2007/0041459 A1* | 2/2007 | Yeon | H04L 27/2624 375/260 |
| 2007/0140101 A1* | 6/2007 | Guo | H04L 27/2618 370/204 |
| 2007/0153673 A1* | 7/2007 | Tomisato | H04L 27/2614 370/480 |
| 2007/0223365 A1* | 9/2007 | Tsfaty | H04L 9/00 370/208 |
| 2007/0280365 A1* | 12/2007 | Seki | H04L 5/0048 375/260 |
| 2009/0004984 A1* | 1/2009 | Chrabieh | H04L 5/0044 455/205 |
| 2009/0052577 A1* | 2/2009 | Wang | H04L 1/0643 375/299 |
| 2009/0161749 A1* | 6/2009 | Nangia | H04L 5/0007 375/233 |
| 2009/0180574 A1* | 7/2009 | Futagi | H04L 1/0013 375/296 |
| 2010/0177832 A1* | 7/2010 | Baliga | H04L 27/2614 375/260 |
| 2010/0239046 A1* | 9/2010 | Chun | H04L 1/0003 375/295 |
| 2011/0158336 A1* | 6/2011 | Jiang | H04L 27/2614 375/260 |
| 2012/0213312 A1* | 8/2012 | Futatsugi | H04L 27/26265 375/296 |
| 2012/0257690 A1* | 10/2012 | Li | H04L 27/2618 375/296 |
| 2013/0266082 A1* | 10/2013 | McGowan | H04L 27/2614 375/260 |
| 2013/0315320 A1* | 11/2013 | McGowan | H04L 27/2655 375/260 |
| 2014/0169501 A1* | 6/2014 | Nazarathy | H04L 27/2663 375/316 |
| 2015/0304146 A1* | 10/2015 | Yang | H04L 27/26536 370/329 |
| 2015/0372843 A1* | 12/2015 | Bala | H04L 27/26524 375/295 |
| 2016/0254889 A1* | 9/2016 | Shattil | H04B 7/0452 370/329 |
| 2018/0068358 A1* | 3/2018 | Hoffberg | G06Q 30/0207 |
| 2018/0139081 A1* | 5/2018 | Guven | H04L 27/2618 |
| 2018/0219711 A1* | 8/2018 | Laporte | H04B 7/0413 |
| 2018/0375707 A1* | 12/2018 | Bala | H04L 27/2605 |
| 2019/0181979 A1* | 6/2019 | Wang | H04L 1/0041 |
| 2019/0245560 A1* | 8/2019 | Yang | H04L 1/0068 |
| 2020/0244501 A1* | 7/2020 | Shattil | H04B 1/69 |
| 2021/0266210 A1* | 8/2021 | Namgoong | H04B 3/46 |
| 2021/0288854 A1* | 9/2021 | Mukkavilli | H04W 76/27 |
| 2021/0344535 A1* | 11/2021 | Sridharan | H04L 27/2618 |
| 2021/0344536 A1* | 11/2021 | Sahraei | H04L 27/2602 |
| 2021/0344537 A1* | 11/2021 | Sahraei | H04L 27/2618 |
| 2021/0344543 A1* | 11/2021 | Sahraei | H04L 27/2614 |
| 2021/0344544 A1* | 11/2021 | Sahraei | H04W 72/0453 |
| 2021/0344545 A1* | 11/2021 | Sridharan | H04W 72/0453 |
| 2021/0359890 A1* | 11/2021 | Sahraei | H04L 27/2614 |
| 2021/0360635 A1* | 11/2021 | Sahraei | H04W 72/0453 |
| 2021/0377088 A1* | 12/2021 | Gaal | H04W 72/0453 |
| 2021/0377089 A1* | 12/2021 | Gaal | H04L 1/0009 |
| 2021/0377090 A1* | 12/2021 | Sahraei | H04L 27/2614 |
| 2021/0409251 A1* | 12/2021 | Yang | H04L 27/2618 |
| 2022/0014409 A1* | 1/2022 | Sahraei | H04L 5/001 |
| 2022/0038322 A1* | 2/2022 | Ly | H04L 27/2614 |
| 2022/0039027 A1* | 2/2022 | Mukkavilli | H04L 27/2614 |
| 2022/0039093 A1* | 2/2022 | Ly | H04L 27/2618 |
| 2022/0052895 A1* | 2/2022 | Ly | H04W 72/042 |
| 2022/0060917 A1* | 2/2022 | Vitthaladevuni | H04W 36/0005 |
| 2022/0070040 A1* | 3/2022 | Namgoong | H04L 27/2649 |
| 2022/0070041 A1* | 3/2022 | Namgoong | G06N 3/08 |
| 2022/0386367 A1* | 12/2022 | Abotabl | H04W 74/0808 |
| 2022/0400042 A1* | 12/2022 | Horn | H04W 24/08 |

* cited by examiner

PEAK REDUCTION TONE ALLOCATION

FIELD OF TECHNOLOGY

The technology discussed below relates generally to wireless communication systems, and more particularly, to avoiding non-linearity in power amplifiers by allocation of peak reduction tones (PRTs).

BACKGROUND

Power amplifiers, including commercial power amplifiers, have a non-linear behavior if operated at input power levels at or greater than their 1 dB compression point levels. This non-linearity results in in-band and out-of-band distortion of an input signal and degraded error vector management (EVM) at the receiver. To avoid or reduce non-linearity in the output signal, a power amplifier may be operated at a gain setting that is several dB lower than the saturation point of the power amplifier. But the amount of gain backoff for the power amplifier depends upon the peak-to-average-power ratio (PAPR) of the output signal. To avoid saturation, the gain backoff may be tied to the PAPR. A signal with a high PAPR would thus require a corresponding large amount of backoff.

Orthogonal frequency-division multiplexed (OFDM) signals are known to suffer from significant PAPR that grows rapidly as the number of resource blocks increases. For example, fifth generation (5G) new radio (NR) may allow higher data rates than long term evolution (LTE). The higher data rates may result in an increased OFDM resource block size, thereby increasing the PAPR. To avoid saturation and clipping, a 5G power amplifier must thus use a relatively high amount of gain backoff. But operation at such a high gain backoff results in poor efficiency and other issues.

SUMMARY

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In accordance with an aspect of the disclosure, a peak reduction tone selection system is provided that includes: a processor configured to: select a sequence of peak reduction tones from a sequence of transmission tones arranged from a first transmission tone to a last transmission tone, each transmission tone having a position in the sequence of transmission tones identified by an index; define a kernel having a value at each index of the sequence of transmission tones by an assignment of a positive value to the kernel at each index in the sequence of transmission tones corresponding to the sequence of peak reduction tones and by an assignment of a zero value to the kernel at each index in the sequence of transmission tones not corresponding to the sequence of peak reduction tones; calculate a cost function of a transform of the kernel to provide a cost function calculation; and determine whether the selection of the sequence of peak reduction tones is suitable for a peak reduction tone technique in a wireless device based upon the cost function calculation.

In accordance with another aspect of the disclosure, a peak reduction tone selection method is provided that includes the acts of: selecting a sequence of peak reduction tones from a sequence of transmission tones arranged from a first transmission tone to a last transmission tone, each transmission tone having a position in the sequence of transmission tones identified by an index; defining a kernel having a value at each index of the sequence of transmission tones by assigning a positive value to the kernel at each index in the sequence of transmission tones corresponding to the sequence of peak reduction tones and by assigning a zero value to the kernel at each index in the sequence of transmission tones not corresponding to the sequence of peak reduction tones; calculating a cost function of a transform of the kernel; and determining whether the selection of the sequence of peak reduction tones is suitable for a peak reduction tone technique in a wireless device based upon the calculation of the cost function.

In accordance with yet another aspect of the disclosure, a network device is provided that includes: a transceiver configured to: combine a first sequence of peak reduction tones and a first sequence of data tones to provide a first sequence of transmission tones forming a first data signal; transmit the first data signal at a first data rate; combine a second sequence of peak reduction tones and a second sequence of data tones to provide a second sequence of transmission tones forming a second data signal, wherein the second sequence of peak reduction tones equals the first sequence of peak reduction tones minus a first peak reduction tone; and transmit the second data signal at a second data rate that is higher than the first data rate.

Other aspects, features, and implementations of the present disclosure will become apparent to those of ordinary skill in the art, upon reviewing the following description of specific, exemplary implementations of the present disclosure in conjunction with the accompanying figures. While features of the present disclosure may be discussed relative to certain implementations and figures below, all implementations of the present disclosure can include one or more of the advantageous features discussed herein. In other words, while one or more implementations may be discussed as having certain advantageous features, one or more of such features may also be used in accordance with the various implementations of the disclosure discussed herein. In similar fashion, while exemplary implementations may be discussed below as device, system, or method implementations it should be understood that such exemplary implementations can be implemented in various devices, systems, and methods.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various implementations and to explain various principles and advantages in accordance with the present disclosure.

DETAILED DESCRIPTION

Figure 1:
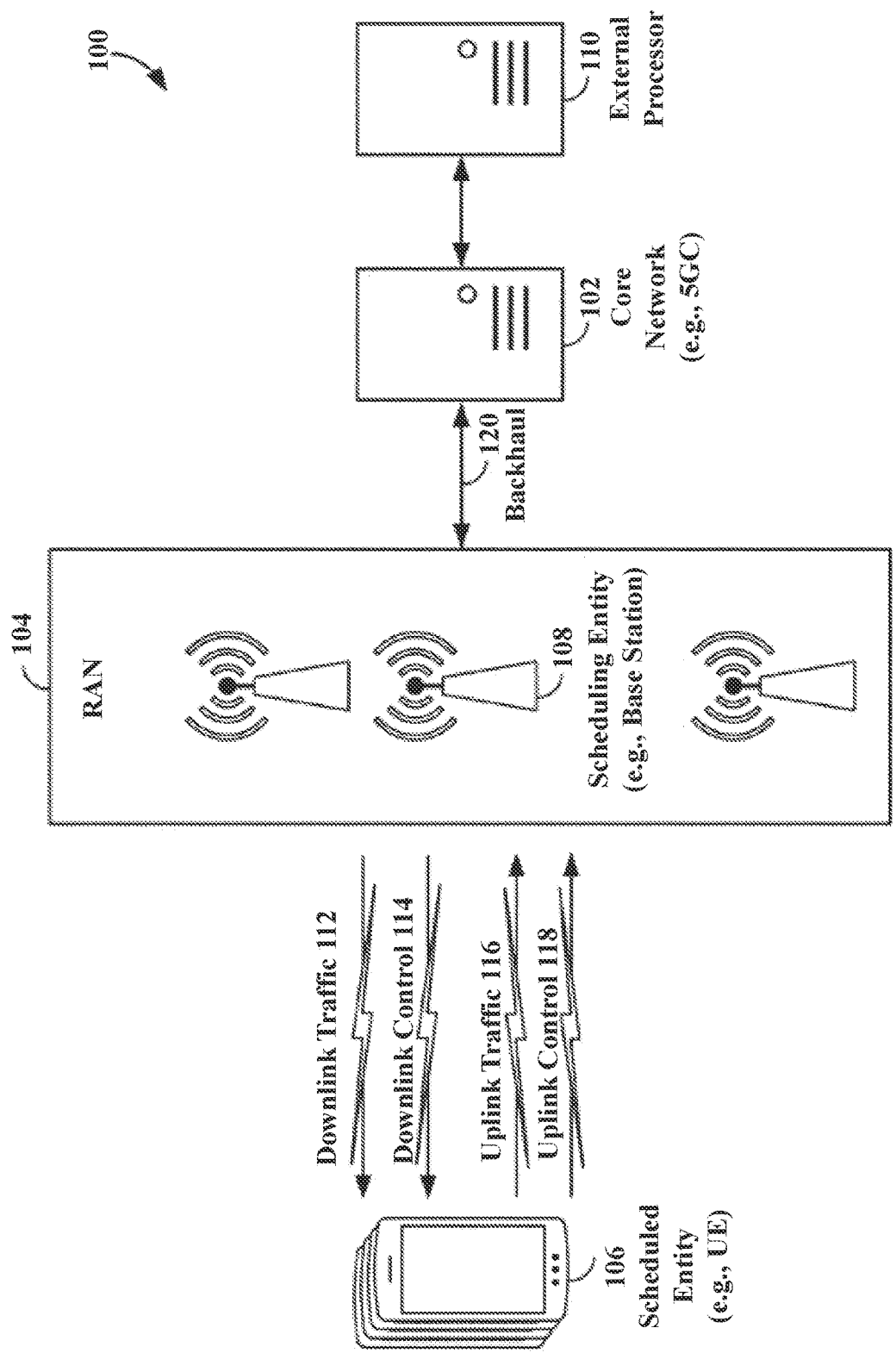
FIG. 1 is a schematic illustration of a wireless communication system including wireless devices that practice PAPR reduction using peak reduction tones selected according to some aspects of the disclosure.

Orthogonal frequency-division multiplexing (OFDM) such as used in NR systems uses a plurality of subcarriers. Each subcarrier may be denoted as a tone. To lower the PAPR of OFDM signals, various peak reduction tone (PRT) techniques have been proposed. In a PRT transmitter, some of the tones that would ordinarily be used for data or control signaling are instead reserved for peak reduction tones. Both the transmitter and receiver need to know the sequence or identity of the peak reduction tones. A PRT sequence is thus established in advance of the PRT signaling. As will be explained further herein, the efficacy of a PRT technique depends considerably on the proper selection of each PRT sequence. But existing techniques to select the peak reduction tones are computationally burdensome. An advantageous PRT reservation or selection technique is disclosed herein to alleviate this computation burden. The peak reduction tones may thus be identified in a computationally efficient fashion so that PRT techniques are made practical. A transmitter may then operate with less backoff, which results in a considerable improvement in transmitter efficiency.

In cellular communication (such as 5G NR or beyond), one or more search-algorithm-generated PRT sequences (e.g., generated by using one of the search algorithms described herein) may be stored in the transmitter and the receiver. In particular, the transmitter/receiver could store one search-algorithm-generated PRT sequence for each resource allocation. In this case, the transmitter and receiver determine which search-algorithm-generated PRT sequence to use based on the resource allocation (e.g., number of resource blocks, number of resource elements, number of subcarriers, or number of frequency tones scheduled for the transmission). For example, a first search-algorithm-generated PRT sequence may be used when the transmission is scheduled with a first plurality of subcarriers/frequency tones, and a second search-algorithm-generated PRT sequence may be used when the transmission is scheduled with a second plurality of subcarriers/frequency tones. Alternatively, a first PRT sequence may be a search-algorithm-generated PRT sequence whereas a second PRT sequence may be generated using an equation/explicit expression or through a pseudo-random sequence. For example, should the resource allocation (e.g., number of subcarriers/resource elements/resource blocks) be smaller than a threshold value, then a transmitter may use the search-algorithm-generated PRT sequence (i.e., a PRT sequence generated via the search algorithms disclosed herein). Conversely, should the resource allocation be larger than the threshold value, the transmitter may use a non-search-algorithm-generated PRT sequence. Alternatively, the search-algorithm-generated PRT sequence may be used in response to the resource allocation being larger than the threshold value whereas the non-search-algorithm-generated PRT sequence may be used in response to the resource allocation being smaller than the threshold value. For ease of reference, a sequence of transmission tones from which the PRTs are selected will also be interchangeably referred to herein as either a set of resources or a set of granted resources. The following discussion will refer to search-algorithm-generated PRT sequences as "PRT sequences" for brevity.

An example wireless network or communication system 100 is shown in FIG. 1 in which a transmitting wireless device reduces its PAPR using a sequence of PRTs selected as discussed herein will first be discussed. The wireless communication system 100 includes three interacting domains: a core network 102, a radio access network (RAN) 104, and a user equipment (UE) 106. The sequence of PRTs may be selected by an external computer 110 configured as a peak reduction tone system. Computer 110 may be located in (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations may be an LTE base station, while another base station may be a 5G NR base station.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communication device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Wireless communication between the RAN 104 and the UE 106 may be described as utilizing an air interface. Transmissions over the air interface from a base station (e.g., base station 108) to one or more UEs (e.g., similar to UE 106) may be referred to as downlink (DL) transmission. In accordance with certain aspects of the present disclosure, the term downlink may refer to a point-to-multipoint transmission originating at a base station (e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, where a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs 106). That is, for scheduled communication, a plurality of UEs 106, which may be scheduled entities, may utilize resources allocated by the scheduling entity.

As illustrated in FIG. 1, a base station 108 may broadcast downlink traffic 112 to one or more one or more UEs 106. Broadly, each base station 108 is a node or device responsible for scheduling traffic in a wireless communication network, including the downlink traffic 112 and, in some examples, uplink traffic 116 from one or more one or more UEs 106. On the other hand, a UE 106 is a node or device that receives downlink control information 114, including but not limited to scheduling information (e.g., a grant), synchronization or timing information, or other control information from another entity in the wireless communication network such as a base station 108.

In general, base stations 108 may include a backhaul interface for communication with a backhaul portion 120 of the wireless communication system 100. The backhaul portion 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

Figure 2:
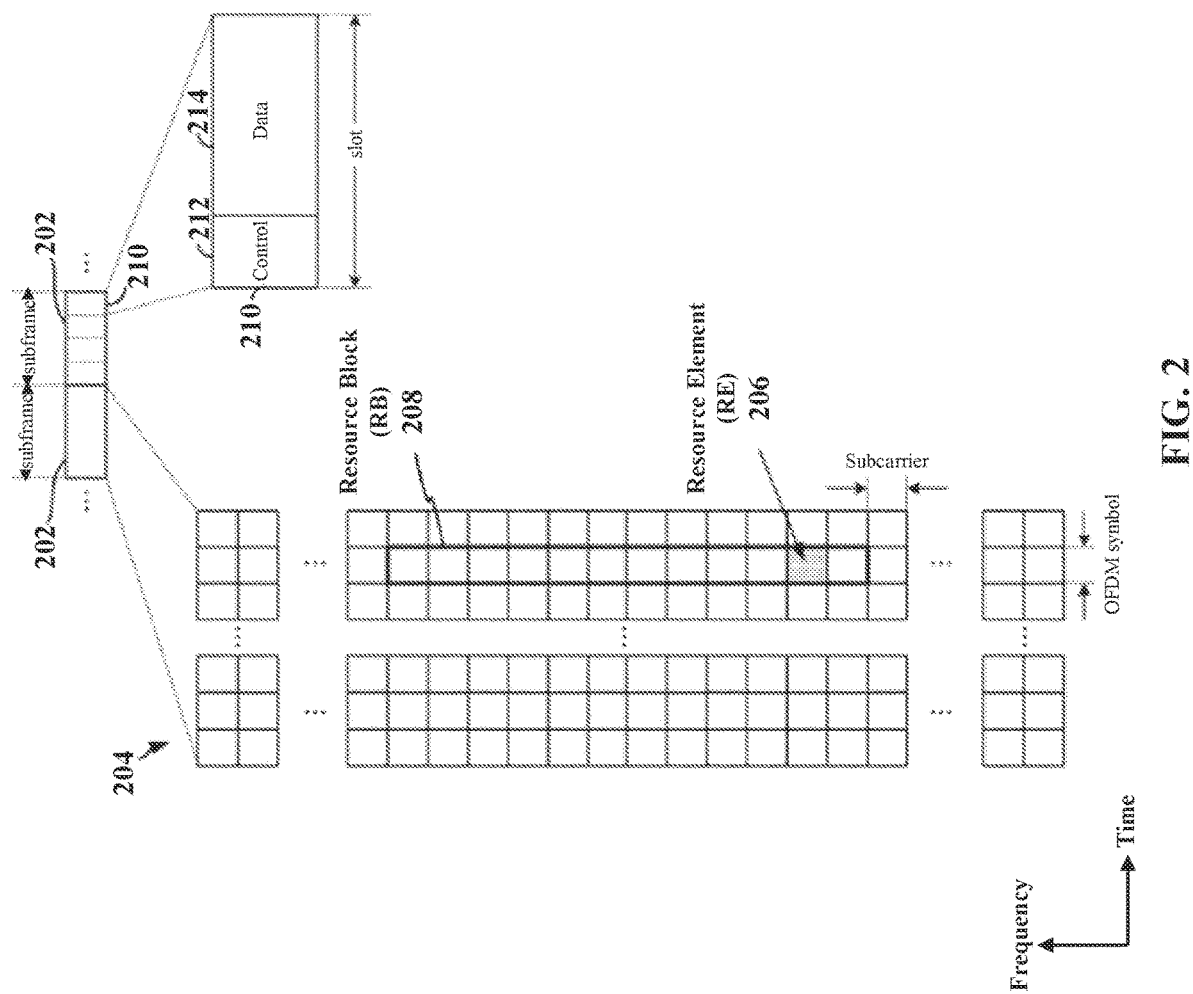
FIG. 2 is an expanded view of an exemplary subframe, showing an orthogonal frequency divisional multiplexing (OFDM) resource grid for the PAPR reduction using peak reduction tones selected according to some aspects of the disclosure.

Transmitting and receiving network devices such as base stations 108 and UEs 106 may each be configured to practice PAPR reduction using PRTs selected according to the PRT reservation technique disclosed herein. Each PRT is selected from a sequence of transmission tones available for use by a transmitting network device. The sequence of transmission tones may also be denoted as a sequence of subcarriers in an OFDM resource grid. An example OFDM resource grid 204 is shown in FIG. 2.

The resource grid 204 is divided into multiple resource elements (REs) 206. An RE, which is 1 subcarrier×1 symbol, is the smallest discrete part of the time-frequency grid, and contains a single complex value representing data from a physical channel or signal. Depending on the transmission and reception scheme utilized in a particular implementation, each RE may represent one or more bits of information. In some examples, a block of REs may be referred to as a physical resource block (PRB) or more simply a resource block (RB) 208, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 208 entirely corresponds to a single direction of communication (either transmission or reception for a given device).

The RB 208 is shown as occupying less than the entire bandwidth of the subframe 202, with some subcarriers illustrated above and below the RB 208. In a given implementation, the subframe 202 may have a bandwidth corresponding to any number of one or more RBs 208. Further, in this illustration, the RB 208 is shown as occupying less than the entire duration of the subframe 202, although this is merely one possible example.

Each 1 ms subframe 202 may consist of one or multiple adjacent slots. In the example shown in FIG. 2, a subframe 202 includes four slots 210, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 210 illustrates the slot 210 including a control region 212 and a data region 214. In general, the control region 212 may carry control channels, and the data region 214 may carry data channels. Of course, a slot may contain all DL, all UL, or at least one DL portion and at least one UL portion. The structure illustrated in is merely exemplary in nature, and different slot structures may be utilized, and may include one or more of each of the control region(s) and data region(s).

Although not illustrated in FIG. 2, the various REs 206 within an RB 208 may be scheduled to carry one or more physical channels, including control channels, shared channels, data channels, etc. Other REs 206 within the RB 208 may also carry pilots or reference signals. These pilots or reference signals may provide for a receiving device to perform channel estimation of the corresponding channel, which may enable coherent demodulation/detection of the control and/or data channels within the RB 208. With these concepts in mind, the disclosed peak reduction tone reservation technique will now be discussed in more detail beginning with a discussion of how PAPR is reduced using a peak reduction tone technique.

PAPR Reduction Using a Signal-to-Clipping Noise Ratio Tone Reservation (SCR-TR) Technique A PAPR reduction through the use of peak reservation tones is disclosed herein that is denoted as a signal-to-clipping noise ratio tone reservation (SCR-TR) technique. With regard to the peak reduction tones, a wireless network device such as a UE or a base station may transmit over a certain number of resource blocks. The available resource blocks for transmission are denoted herein as a sequence of transmission tones. In the SCR-TR technique, a subset of the tones in the sequence of transmission tones are peak reduction tones. Data tones form a remainder of the sequence of transmission tones. The term "data" for tones that are not peak reduction tones is used herein to encompass both data traffic (e.g., downlink traffic 112, uplink traffic 116 of FIG. 1) and control (e.g., downlink control 114, uplink control 118 of FIG. 1).

Figure 3:
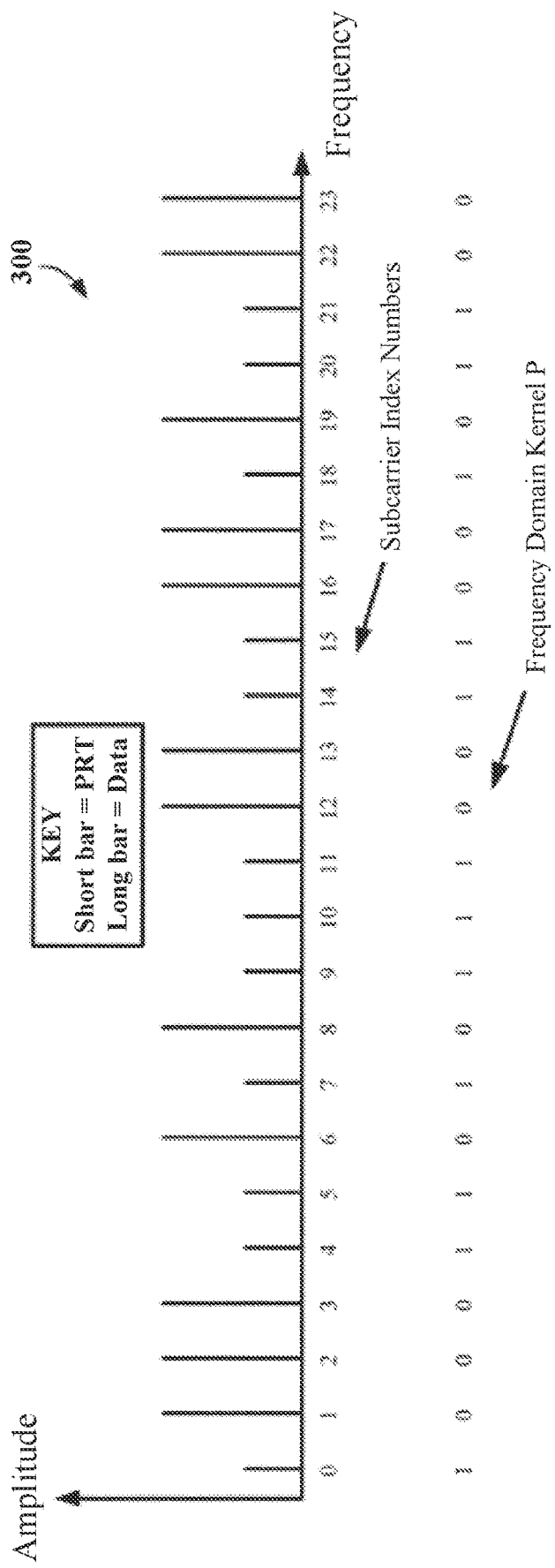
FIG. 3 is a plot of data tones and peak reduction tones according to some aspects of the disclosure.

An example sequence 300 of transmission tones for an SCR-TR technique is shown in FIG. 3. In FIG. 3, frequency is represented along the horizontal axis and amplitude is represented along the vertical axis. In sequence 300, there are 24 transmission tones arranged from a first transmission tone to a last transmission tone. Sequence 300 thus ranges across two consecutive resource blocks. Each transmission tone has a position or location within the sequence 300 as identified by a respective index. In sequence 300, the first transmission tone has an index of 0, the second transmission tone has an index of 1, and so on such that the 24$^{th}$ transmission tone has an index of 23.

As selected by a peak reduction tone selection technique, a subset of the tones in sequence 300 are reserved for PRTs. The remaining tones in sequence 300 are data tones. In sequence 300, the PRTs are located at subcarrier index numbers 0, 4, 5, 7, 9, 10, 11, 14, 15, 18, 20, and 21. The indices occupied by PRTs may be identified through what is denoted herein as a kernel in the frequency domain. The kernel may be designated by a capital letter P and is a sequence of binary numbers corresponding to each index in the sequence of transmission tones (e.g., sequence 300). For sequence 300, kernel P thus has 24 binary values or entries corresponding to the 24 indices of sequence 300. For each index of a PRT, kernel 304 equals a unit value 1. Conversely, kernel 304 equals zero for each index of a data tone.

In the following discussion the time domain transform of kernel P is denoted using a uncapitalized letter p. Similarly, the data tones are denoted using a capital letter X whereas the time domain transform of X is denoted using an uncapitalized letter x. The following discussion will assume that the time domain transform is an inverse fast Fourier transform without loss of generality. As will become clear from the following discussion, the PRTs should be selected so that the transform kernel p of the PRTs resembles a delta function having negligible sidelobes. Such a time domain transform kernel p results if there are a sufficient number of PRTs and the selection is performed using a cost function as disclosed herein.

In some implementations, the sequence of transmission tones may be deemed to be arranged according to a set of indices $\{1, \ldots, N\}$, where the initial transmission tone has index 1, the subsequent transmission tone has index 2, and so on such that the Nth transmission tone has index N. The kernel P of the sequence of PRTs is selected from this sequence of N transmission tones (N being a plural positive integer). Let $\Phi$ be a subset of the sequence $\{1, \ldots, N\}$ corresponding to the locations of the PRTs. The subset $\Phi$ may also be referred to as the second subset herein. The remaining subset of tones may be used for data tones and may be referred to as the first subset herein. The first subset of tones may be identified as $\{1, \ldots, N\}\backslash\Phi$, where the "\" in the formula A\B is known as a relative complement, and the formula in the form of A\B indicates "the objects that belong to A and not to B." Therefore, $\{1, \ldots, N\} \backslash \Phi$ equals the set of tones $\{1, 2, 3, 4, 6, 8, 12, 13, 16, 17, 19, 22, 23\}$ in the example of FIG. 3.

According to the PRT selection technique disclosed herein, a kernel P of the sequence of PRTs for subset $\Phi$ may be constructed as:

$$P_i = \begin{cases} 1, & \text{if } i \in \Phi \\ 0, & \text{if } i \in [N]\backslash\Phi \end{cases}$$

where i is an index number of a tone (e.g., i=subcarrier index number) and [N] represents the number of tones in the sequence of transmission tones. The formula $i \in \Phi$ indicates "i is an element of $\Phi$" and the formula in the form of $i \in [N]\backslash\Phi$ indicates "i is not an element of $\Phi$."

Next, a time domain representation, p, of the frequency domain kernel, P, is obtained such as by taking the inverse fast Fourier transform of P, where:

$$p = ifft(P)$$

Next, let X be the collection of data tones in the sequence of transmission tones. It may be observed that that the ith value of X (Xi), equals 0, if $i \in \Phi$. In other words, the ith value of X (Xi) is equal to 0 if i is an element of $\Phi$ (i.e., if i is an element of the set of subcarrier index numbers allotted to the second subset of the plurality of tones).

Two observations may be made with respect to the operation of the SCR-TR algorithm for PAPR reduction using peak reduction tones reservation. First, the time domain transform kernel p looks like a delta function with negligible sidelobes if the number of reserved tones is sufficiently large and the corresponding indices are appropriately chosen. Second, circularly shifting the transform kernel p does not impact the location of peak reduction tones in the frequency domain, but rather disturbs their phase.

With the kernel P selected (which in turn establishes the transform kernel p), it may be shown that the SCR-TR algorithm for PAPR reduction may include the following four steps:

1. Find the location of the largest peak of x (the IFFT of the frequency domain signal X of the data tones). Let $j \in \{1, \ldots, N\}$ be the index of the sequence of transmission tones, where N is an positive plural integer equaling the number of transmission tones in the sequence.

2. Circularly shift p so that the peaks of x and p are aligned. For example, $p_j$=circshift(p, j), where circshift (p, j) is the circular shift of p by j units to the right. The value of j may be incremented to produce the circular shift of the original waveform p.

3. Subtract a scaled and shifted p from x to obtain $$x_{new} = x - \frac{|X(j)| - \mu}{p(0)} P_j e^{i \angle x(j)},$$

where $x_{new}$ is the time domain data signal after PAPR reduction, $\mu$ is the target peak of $x_{new}$, $\angle x(j)$ is the phase of $x(j)$, and $i=\sqrt{-1}$.

4. Iterate several times to reduce several peaks in the time domain data. The resulting time-domain data signal $x_{new}$ has a reduced PAPR as compared to the original time-domain signal x. A network device may then transmit $x_{new}$ instead of x to send the desired data but at a reduced PAPR.

Figure 4:
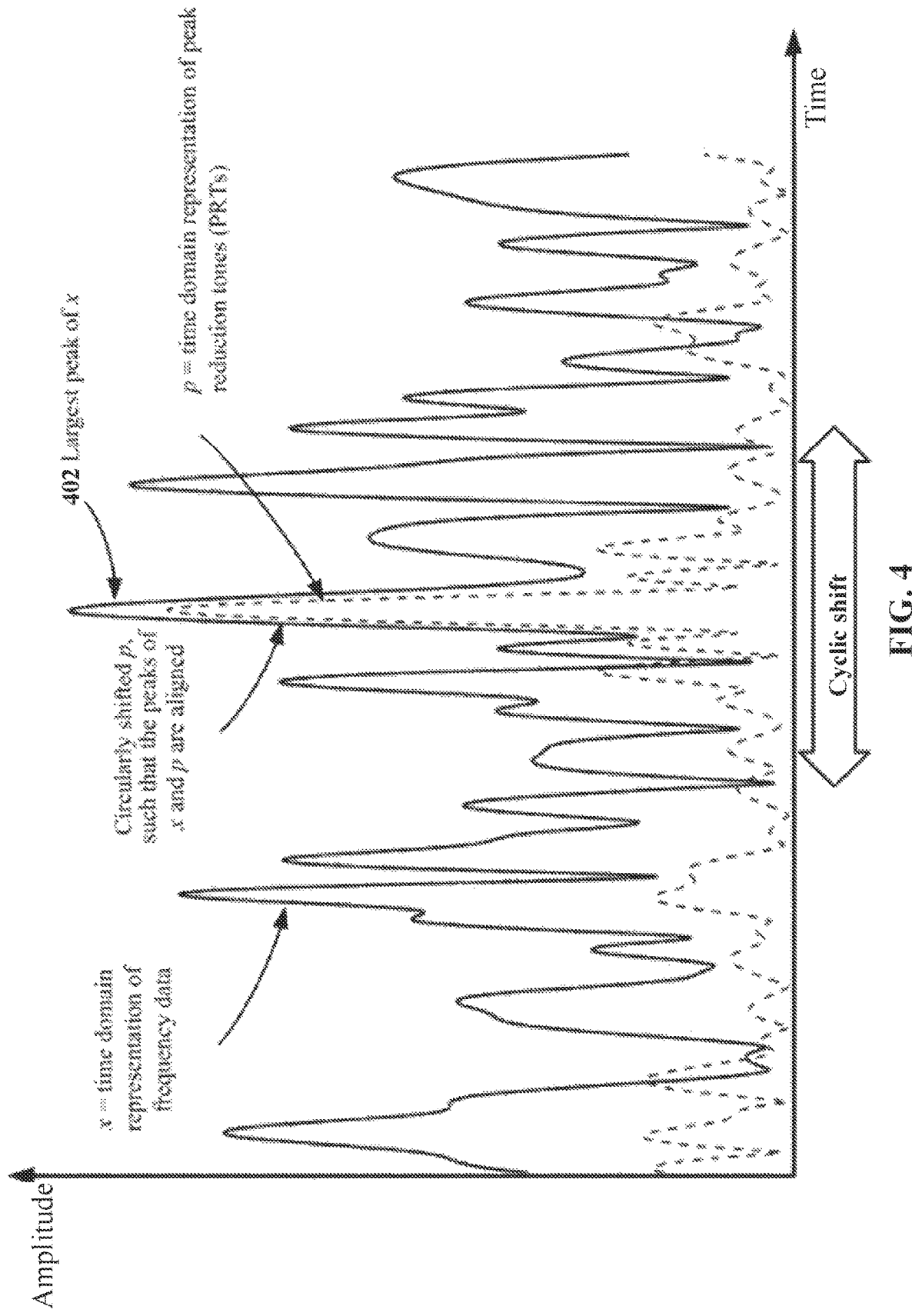
FIG. 4 is a plot of a time domain transform of the data tones and peak reduction tones selected according to some aspects of the disclosure.

To better appreciate the operation of the SCR-TR algorithm or technique, an example time domain data signal x is shown in FIG. 4. An example time domain transform kernel p has a suitably large and narrow main lobe with relatively negligible sidelobes. Kernel p has been circularly shifted so that its main lobe aligns with a largest peak 402 of the data signal. It is readily seen that following the subtraction of p from x, the resulting data signal $x_{new}$ (not illustrated) will have a considerably reduced amplitude at the time of largest peak 402. The PRT selection or reservation technique will now be discussed in more detail PRT Selection Once selected for use as a PRT, that tone is no longer available for data. Since each PRT is not used for data, both the transmitter of $x_{new}$ and the receiver of $x_{new}$ should know whether the transmitter is using the SCR-TR technique and also know the identity of the corresponding PRTs. In addition, a transmitter may inform a receiver that the transmitter is, or is not, using the SCR-TR technique. The receiver may be informed about whether the transmitter is, or is not, performing PAPR reduction with the SCR-TR technique, for example, through a flag as represented by one or more bits conveyed in user plane data or control plane signaling. If the transmitter is not using PRTs (e.g., signified by the one bit representing "false"), then the entire sequence of transmission tones may be used for data. In other words, if the transmitter is not using PRTs (e.g., signified by the flag being "false"), then all tones in a given set of resources may be used for data. If the transmitter is using PRTs (e.g., signified by the flag being "true"), then only a first subset of the sequence of transmission tones of may be used for data and is intended to be decoded. Conversely, a second subset of the sequence of transmission tones is used for PRTs and may be ignored (e.g., may not be decoded into data) by the receiver.

The transmitter may base a decision to reduce PAPR using the SCR-TR technique, for example, on the availability of resources. For example, if a transmitter has a large amount of data in a buffer that is awaiting transmission, the transmitter may determine not to use PRTs and instead, use all available resources for the transmission of the buffered data. The transmitter may base a decision to use, or not use, PRTs on other aspects or considerations, such as quality of service (QoS) or latency associated with data awaiting transmission stored in the buffer of the transmitter. Other factors on which a transmitter may base a decision to use, or not use, PRTs are within the scope of the disclosure.

The selection of the PRTs from a given sequence of transmission tones may be performed offline by a processor (e.g., processor 110 of FIG. 1). A network device may then be configured with the PRT selection. Such a pre-assignment or selection of PRTs may be, for example, fixed by specifications and configured on both the transmitting and receiving network devices (e.g., UEs and base stations).

Figure 5A:
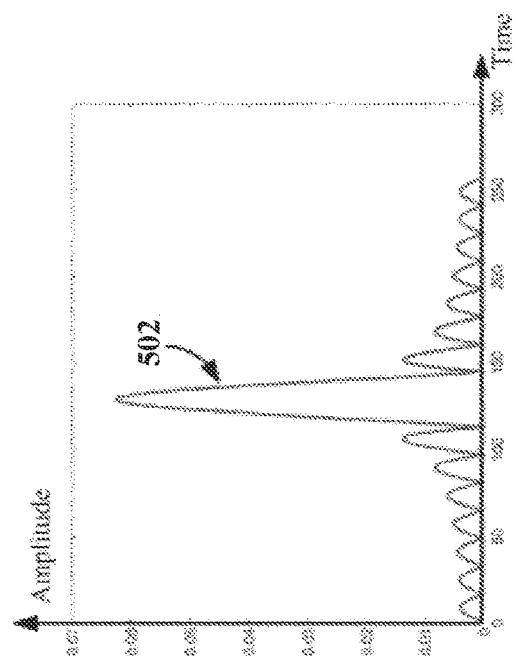
FIGS. 5A, 5B, and 5C are diagrams illustrating example time domain representations of various inverse fast Fourier transforms (IFFTs) of respective kernels selected according to some aspects of the disclosure.

With regard to the selection of the PRTs, the kernel p should approximate a delta function as discussed earlier in that it is desirable that the kernel p have a relatively large and narrow main lobe and have sufficiently negligible sidelobes. With such a time-domain profile, the subtraction of the transform kernel p (with any required circular shifting) from the data signal x results in the elimination or reduction of the peak (or peaks) in the revised data signal $x_{new}$ such that the PAPR is sufficiently reduced. With regard to the appropriate selection of the PRTs, suppose that a contiguous set of the transmission tones are selected to form the sequence of PRTs. The resulting transform kernel 502 is shown in FIG. 5A. Because the selected PRTs were contiguous, the transform kernel 502 has a sinc function profile that results in relatively negligible sidelobes. But the main lobe is too wide. Referring again to FIG. 4, if the main lobe of transform kernel p was widened in this fashion, it may be readily seen that not only the largest peak 402 of the data would be suppressed but also the non-peak data to either side of the peak would be undesirably suppressed. Accordingly, it may be seen that a selection of the PRTs should not be contiguous.

Figure 5C:
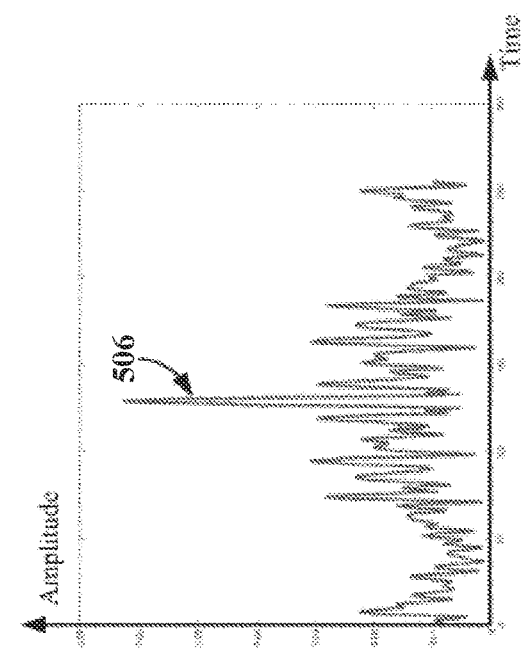
Figure 5B:
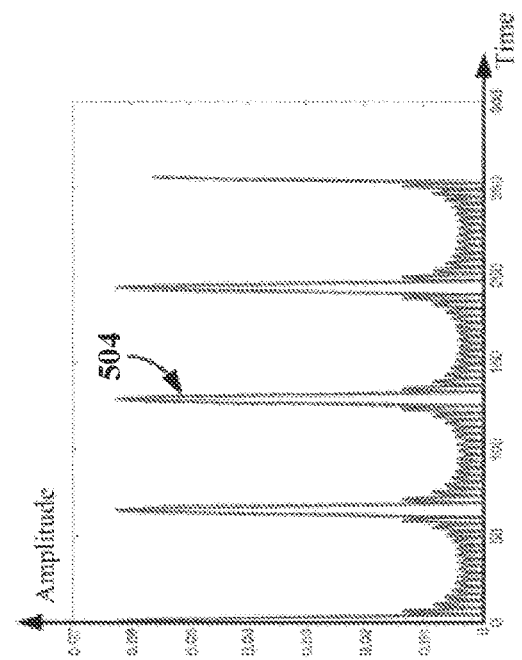

Another undesirable selection of the PRTs results in a transform kernel 504 as shown in FIG. 5B that has a comb-like profile. In comparison to the transform kernel p of FIG. 4, the width of a primary or peak lobe in transform kernel 504 (in the center of the image) is narrow; however, the side lobes (i.e., the high peak signals to the left and right of the center lobe) have amplitudes that are substantially similar to that of the main lobe. These relatively large s idelobes will also undesirably subtract from the time-domain data as the data tones being affected were not peak tones. The comb-shaped kernel 504 is thus unsuitable for step 3 of the SCR-TR algorithm.

A more suitable transform kernel 506 is shown in FIG. 5C in which the main lobe is flanked on either side by sufficiently smaller peak sidelobes. Transform kernel 706 may represent a reasonable trade-off between obtaining the suppressed sidelobes of FIG. 5A and narrow main lobe of FIG. 5B. A technique to find or identify such a suitable sequence of subcarriers or tones for the PRTs will now be discussed in more detail.

With regard to selecting a suitable sequence of PRTs, a Golomb ruler technique may be used to identify an optimum or perfect kernel. But a Golomb ruler technique is impractical due to its excessive computation complexity. The tone reservation disclosed herein produces a "good enough" kernel having a transform such as shown in FIG. 5C at a considerably reduced computation complexity. In a Golomb ruler tone reservation, the PRTs would be located such that the distances between successive PRTs satisfies the spacing of a Golomb ruler. But due to the complexity involved, a Golomb ruler tone reservation is not practical for a relatively large set of subcarriers such as would be used in a typical 5G bandwidth allocation. Indeed, the highest order of known Golomb rulers is 27 (x=27). Given that a sequence of PRTs selected to satisfy an optimal Golomb ruler of order x is suitable for reducing the PAPR of a sequence of transmission tones of length$\approx x^2$ tones, the optimal Golomb ruler of order 27 will support up to $27^2$ tones; that is, 27*27=729 tones, or 729/12$\approx$60 RBs (given that there are 12 tones per RB). Here, the 729 tones refer to the total number of tones in the sequence of transmission tones (e.g., the data tones plus the PRTs) of an RF signal. A transmitter may utilize more than 60 RBs. For example, for a channel that has a 100 MHz bandwidth, a transmitter may utilize up to 272 RBs (corresponding to 3264 tones). A Golomb-ruler-based PRT selection is thus not practical for a relatively large sequence of transmission tones.

Another problem for a Golomb ruler tone reservation is that the Golomb ruler results in a fixed PRT selection, it is not flexible. This is a problem for protocols such as 5G as tones may be reserved for other purposes such as reference signals. A Golomb ruler tone reservation may then result in a forbidden index for a PRT as that corresponding transmission tone must be dedicated to another use such as a reference signal. In addition, if a transmitter utilizes more than 60 RBs, as explained above, there is no known optimal Golomb rulers above order of 27 due to computational complexity. To provide a more general solution that may identify the tone reservations for an arbitrary number of resource blocks, a cost function (denoted as $f$) is applied to the transformed kernel p. The impractical complexity of a Golomb ruler tone reservation is thus reduced to the identification of an optimal PRT sequence that provides a satisfactory value to the cost function.

As discussed earlier, the available bandwidth for a transmitter such as a given number of RBs may be deemed to form a sequence of transmission tones arranged from a first transmission tone to a last transmission tone, each transmission tone having a position or order in the sequence of transmission tones identified by an index. For example, referring again to FIG. 4, there are 24 transmission tones arranged from a first tone at index 0 to a last tone at index 23. From these transmission tones, certain tones may be excluded as possible PRTs due to their reservation to form reference signals or other required usages. For example, suppose that the transmission tones at indices 1 through 3 are reserved for other uses. A selection of PRTs thus avoid indices 1 through 3. The sequence of transmission tones may thus be subdivided into a set of available transmission tones and a set of reserved transmission tones. If it is assumed that tones at indices 1 through 3 are the only reserved tones in the sequence of FIG. 5, then the sequence of available transmission tones is formed by the transmission tones at indices 0 and 4 through 23.

The PRT selection is then made from the set of available transmission tones. Note that the PRT selection should be rate compatible with the data. In other words, as the data rate is increased, the number of PRTs needs to be reduced so that the number of data tones may be increased to accommodate the higher data rate. Fewer PRTS may thus be selected from the set of available transmission tones for relatively high data rates whereas more PRTs may be selected at relatively low data rates. The selection of PRTs is thus rate dependent. For a given sequence of transmission tones, the number of PRTs that are selected from the available transmission tones is then determined by the data rate. Such a sequence of PRTs is denoted herein as a rate matched sequence of PRTs. To reduce the calculation complexity, the data rates may be quantized. For example, a first data rate range may correspond to the selection of a first number of PRTs, a second data rate range may correspond to the selection of a second set of PRTs, and so on. The resulting rate matching will be discussed in more detail herein. Suppose that the number of PRTs that will be selected based upon the data rate has been established. A computer may then randomly select that number of PRTs from the set of available transmission tones, which results in the frequency domain kernel P and the time domain transform kernel p.

For example, referring again to FIG. 3, the computer may have randomly selected the PRTs to be located at indices 0, 4, 5, 7, 9, 10, 11, 14, 15, 18, 20, and 21. Whether such a PRT selection results in a sufficiently suitable transform kernel p is then determined through application of a cost function on the transform kernel p. A suitable cost function provides a tradeoff for the desired properties of an optimal PRT sequence. Exemplary desired properties may include:

α: width of a main peak (the largest peak) of the kernel, which ideally would be just one tone in width and thus should be made as small as possible;

β: magnitude of the main peak of the kernel, which should be as large as possible;

γ: magnitude of the second-largest peak of the kernel, which should be as small as possible; and λ: phase-ramp in time domain, which is to achieve the same phase ramp on the PRT kernel and waveform, allowing the PRTs as close to data tones as possible and ideally interleaved.

A cost function providing a tradeoff of the above exemplary properties α, β, γ, and λ is denoted herein as $f_n(\alpha, \beta, \gamma, \lambda)$, where n represents the number of peak reduction tones (PRTs). As provided for illustrative and non-limiting purposes, an exemplary cost function may be chosen as $$f_n(\alpha, \beta, \gamma, \lambda) = \frac{\gamma}{\beta} \times \frac{1}{1_{\{\alpha \leq W\}}} \qquad \text{Eq. (1)}$$

It is arbitrary whether the cost function should be constructed such that an improved transform kernel p results in a lower cost or in a higher cost. The following discussion will assume that the cost function is constructed so that transform kernels with an improved profile result in a reduced cost. A computer may the randomly select a sequence of PRTs, examine the resulting cost function, and decide if the resulting cost is sufficiently low. For example, the cost function may be compared to a threshold such that the PRT selection is deemed to be suitable if the cost function is lower than a threshold value. As a higher cost is less desirable, to minimize $f_n(\alpha, \beta, \gamma, \lambda)$ in Equation 1, a ratio of magnitudes of the second to the first largest peak (γ/β) should be minimized. To keep the main lobe width (as quantified through α), the cost function of Equation 1 has an infinite cost if α is greater than a threshold W. Should α be less than or equal to threshold W, the cost function of Equation 1 devolves to just equal the ratio of γ/β.

As provided for illustrative and non-limiting purposes, another exemplary cost function may be chosen as $$f_n(\alpha, \beta, \gamma, \lambda) = \frac{\gamma \alpha}{\beta} \qquad (2)$$

Similar to the cost function in Equation 1, to minimize $f_n(\alpha, \beta, \gamma, \lambda)$ in Equation 2, a ratio of magnitudes of the second to the first largest peak (γ/β) should be minimized to provide a lower cost. Similarly, the cost function of Equation 2 results in a reducing cost as the main lobe width α is reduced.

More sophisticated cost functions may take into account all the peaks of the kernel. For example, an exemplary cost function may be chosen as $$f_n(\alpha, \beta, \gamma_{2:n}, \lambda) = \text{var}(\gamma_{2:n}) \qquad (3)$$

where $\gamma_{2:n}$ represents the ith peak in second, third, . . . and $n^{th}$ largest peaks of the kernel, such that minimizing the variance (as represented by var) guarantees that excluding the largest peak, the transform kernel is as flat as possible in the time domain.

Similar to the cost function in Equation 3, a cost function may be chosen as a tradeoff between the variance of $\gamma_{2:n}$ and magnitude of the main peak of the kernel ($\beta$), such as $$f_n(\alpha, \beta, \gamma_{2:n}, \lambda) = \frac{\text{var}(\gamma_{2:n})}{\beta} \quad (4)$$

Alternatively, a cost function may be chosen as a tradeoff between the variance of $\gamma_{2:n}$, amplitude ($\beta$) of the main peak of the transform kernel, and width ($\alpha$) of the main peak of the transform kernel, such as $$f_n(\alpha, \beta, \gamma_{2:n}, \lambda) = \frac{\text{var}(\gamma_{2:n}) \times \alpha}{\beta} \quad (5)$$

After a cost function is determined (such as one of the exemplary cost functions $f_n$ in Equations 1-5), selecting an optimal sequence of PRTs translates to searching the space of possible PRT sequences to identify a sequence of PRTs that sufficiently minimizes the cost function. Note again the flexibility the resulting PRT selection provides in that the set of available transmission tones from which the PRTs are selected excludes transmission tones required for other uses such as for reference signals. In addition, there is no size restriction on the resulting number of PRTs that are selected. The application of the cost function on the transform kernel P to select the PRTs may be summarized as follows:

1. Determine a number of peak reduction tones (PRTs) to be selected, denoted as n. The PRTs are selected from a sequence of N transmission tones.
2. Determine desired properties of an optimal PRT sequence, such as $\alpha$, $\beta$, $\gamma$, and $\lambda$.
3. Chose a cost function as a tradeoff of the desired properties, denoted as $f_n$.
4. Search the space of possible PRT sequences to identify an optimal PRT sequence that sufficiently minimizes $f_n$.

Regarding step 4, one implementation is to exhaust the whole space of possible PRT sequences to identify an optimal PRT sequence that minimizes $f_n$. Such an exhaustive search ensures that the resulting PRT selection is optimal but may result in a computational burden. An alternative implementation is to set a threshold for $f_n$ and begin selecting and testing various PRT sequences (the selection may be either random or according to an algorithm) until a selected PRT sequence produces a cost that is less than or equal to the threshold. Yet another alternative is to determine a subset of PRT sequences to examine from the whole space of possible PRT sequences (either randomly or through an algorithm) and identify the PRT sequence associated with the minimum cost among this subset of PRT sequences.

Suppose that an example sequence of transmission tones is formed by thirty-one transmission tones and that the number n of PRTs to be selected is six. In addition, it is assumed in this example that all the transmission tones are available for PRT selection. In other words, the set of available transmission tones is the same as the entire sequence of transmission tones. The number of different ways that six PRTs may be selected from a sequence of 31 transmission tones is given by the binomial coefficient C(31,6), which equals 736,281 possible selections of the six PRTs. More generally, the number of different ways that n PRTs may be selected from a set of N available transmission tones is given by the binomial coefficient C(N,n). Referring again to step 4 above, one implementation is to examine each of the possible C(N,n) PRT sequences and identify the PRT sequence that minimizes the selected cost function. An alternative would be to set a cost threshold and start picking from the set of possible C(N,n) PRT sequences (randomly or through an algorithm) until a PRT sequence is selected that results in a cost that is less than or equal to the cost threshold. The PRT sequence that satisfies the cost threshold would then be deemed to be the optimal PRT sequence. Alternatively, a subset of the C(N,n) possible PRT sequences may be chosen. Each PRT sequence in the subset of possible PRT sequences may then be tested by cost function to identify the PRT sequence having the lowest cost.

As discussed earlier, the PRT selection may be rate compatible with the data. In other words, as the data rate is increased, the number n of PRTs needs to be reduced so that the number of data tones may be increased to accommodate the higher data rate. Conversely, the number n may be increased for lower data rates. For a given transmission, the transmitter may determine how many peak reduction tones to select based on the data rate and/or other explicit indications (e.g., should the transmitter be a UE and receiver be a base station, the UE may receive an indication of how many peak reduction tones to use from the base station). Moreover, the indices of the peak reduction tones may be determined based on an initial PRT sequence (i.e., a "mother" PRT sequence) such as determined by the transmitter based on the resource allocation), as well as the number of peak reduction tones. More specifically, the initial PRT sequence defines a set of ordered tone indices to be selected for a subsequent peak reduction tone transmission. The transmitter may then select the first n tones from the set of ordered tone indices, where n is the total number of peak reduction tones to be used for the transmission. As an example, a PRT sequence of 12 tones may be at tone indices 6, 3, 11, 7, 8, 5, 1, 2, 4, 9, 10, and 12. Should the transmitter need to use only 3 peak reduction tones, it may then determine to use tones at indices 6, 3, and 11.

With regard to the selection of rate compatible PRTs, the following discussion will assume that n is a positive integer equaling the maximum possible number of PRTs that may be selected. Such a selection of n PRTs would be made for a relatively low data rate. As the data rate is increased, the number of selected PRTs is sequentially reduced. There would thus be a selection of (n−1) PRTs for a slightly higher data rate, a selection of (n−2) PRTs for an even higher data rate, and so on. The lowest number of PRTs that could possibly be selected is of course one but to provide a sufficient PAPR reduction, the minimum number of PRTs to be selected may be (n−M) in some implementations, where M is a positive integer that is less than (n−1).

For a given number of RBs and a given data rate (or data rate range), there is thus a maximum number n of PRTs that may be selected. This selection of n PRTs is denoted as the maximum set herein. But there would be various reduced number of PRTs that may be selected as the data rate increases. There is thus a plurality of rate compatible or rate matched PRT sequences that may be selected for any given maximum number n of possible PRTs. One rate compatible selection would be a set of n PRTs, another would be a set of (n−1) PRTs, and so on. It would be rather computation intensive to independently select each rate compatible set of PRTs. The following discussion will thus assume that the rate compatible sets for the reduced number of PRTs (a sequence of less than n PRTs such as (n−1), (n−2), and so on) will be based upon the maximum set of PRTs. In other words, to reduce to the (n−1) set, a PRT is removed from the maximum set of PRTs. To reduce to the (n−2) set, two PRTs are removed from the maximum set of PRTs and so on such that an (n−X) set would be formed by removing X PRTs from the maximum set of PRTs.

Figure 6:
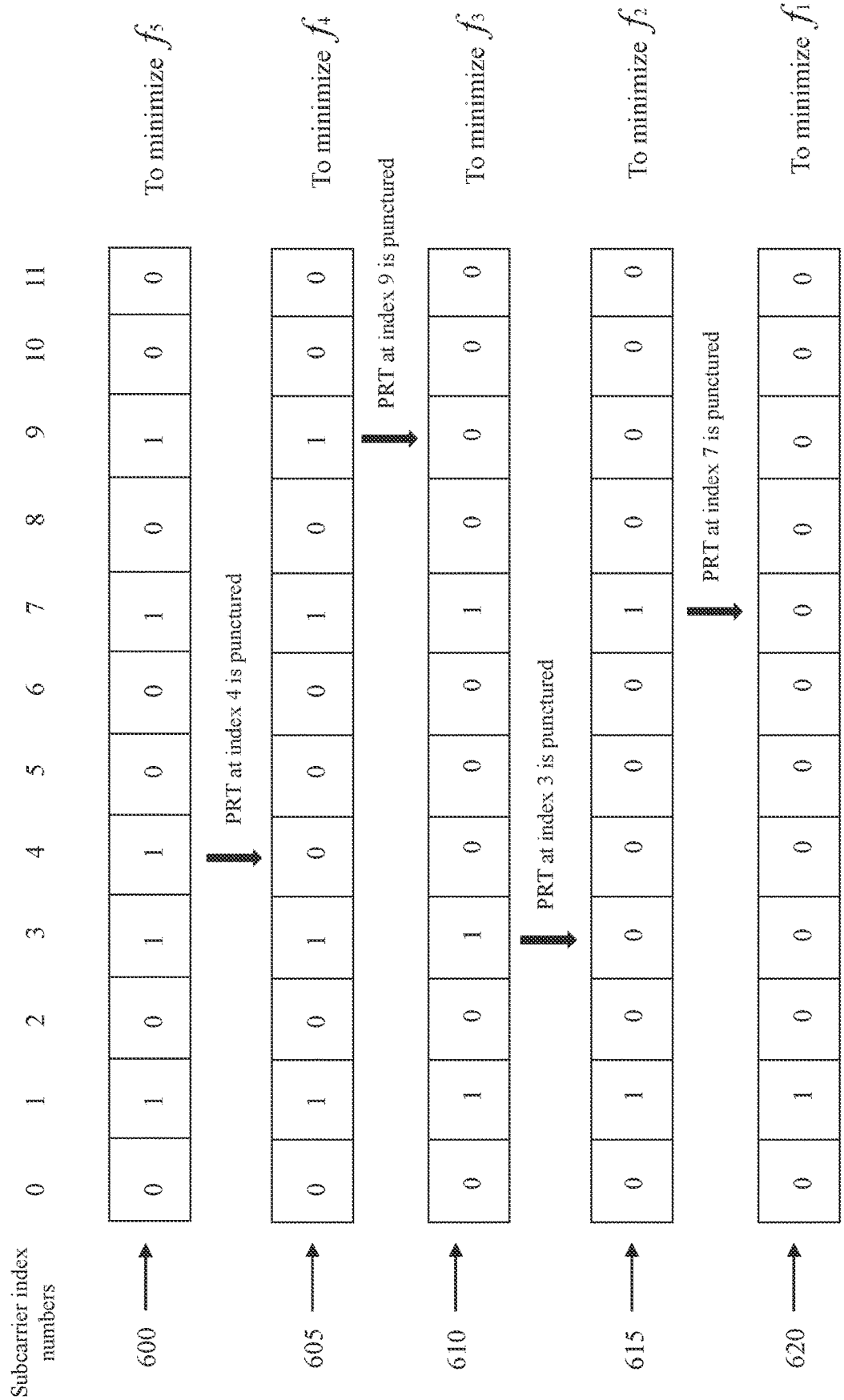
FIG. 6 illustrates a series of sequences of peak reduction tones selected according to puncturing single peak reduction tones from a first sequence of peak reduction tones based upon individual cost functions calculated on each sequence in the series of sequences according to some aspects of the disclosure.

In one implementation, each of the n PRTs in the maximum set could be selectively deleted and the resulting increase in the cost function determined. The PRT that results in the lowest cost increase is then selected to form the (n−1) set. Such an approach is denoted herein as an individual cost technique in that the PRT that results in the lowest cost is punctured or deleted. The puncturing approach may then be successively applied to the resulting (n−1) sequence of PRTs. Each of the (n−1) PRTs may then be selectively deleted and the resulting cost determined. The PRT that results in the in lowest cost is then the punctured one to form the selection of the (n−2) PRTs from the (n−1) PRTs. More generally, the puncturing technique is applied to reduce each successively smaller set of PRTs to the next smallest set. An example individual cost technique for a maximum set 600 of five PRTs is shown in FIG. 6. In this example, maximum set 600 is selected from a resource block such that there are 12 total transmission tones, indexed from 0 to 11. This maximum set of PRTs is selected using a corresponding cost function $f_5$. The five PRTs in set or sequence 600 are located at indices 1, 3, 4, 7, and 9. A cost function $f_4$ is then used to determine the least cost that results from selectively deleting each PRT. In other words, the PRT at index 1 would be deleted from sequence 600 and a resulting cost determined. Similarly, the PRT at index 3 would be deleted from sequence 600 and a resulting cost determined and so on until the cost of removing each PRT individually is determined. In this example, it is found that puncturing the PRT at index 4 results in the lowest cost to form a sequence 605 of four PRTs. Sequence 605 thus has the remaining PRTs from sequence 600 at indices 1, 3, 7, and 9.

The cost of individually removing each PRT in sequence 605 is then tested according to a cost function $f_3$. Based upon this cost function, it is determined that puncturing the PRT at index 9 results in the lowest cost to form a sequence 610 of three PRTs at indices 1, 3, and 7. A cost function $f_2$ is then used to determine that it should be the PRT at index 3 that is removed from sequence 610 to form a sequence 615 having just two PRTs at indices 1 and 7. Finally, a cost function $f_1$ is applied to determine that it is the PRT at index 7 that should be removed from sequence 615 to form a sequence 620 having just the PRT at index 1.

Figure 7:
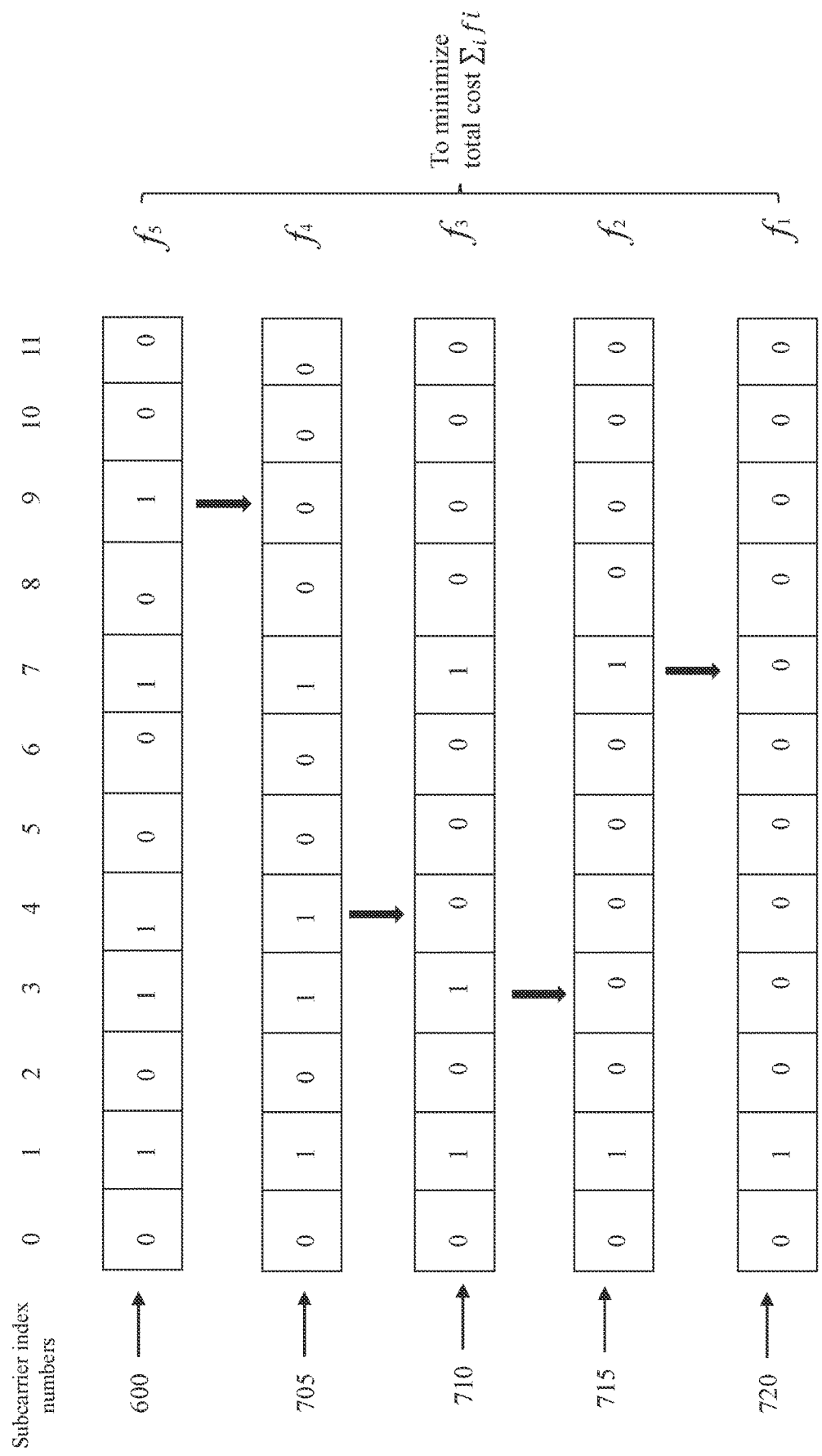
FIG. 7 illustrates a series of sequences of peak reduction tones selected according to puncturing peak reduction tones from a first sequence of peak reduction tones based upon a sum of individual cost functions calculated on each sequence in the series of sequences according to some aspects of the disclosure.

Although the individual technique is relatively simple to implement, note that there is an overall cost for the various rate compatible PRT sequences. In the example of FIG. 6, the overall or total cost would be the sum of $f_5$ through $f_1$. But this overall cost may be reduced if the overall cost is used to determine the puncturing from one PRT sequence to the next smallest sequence. For example, sequence 600 from FIG. 6 is shown again in FIG. 7 but in this example sequence 600 is successively punctured to minimize the overall cost. If just the individual cost is considered from puncturing sequence 600 to remove one PRT, it would be the PRT at index 4 that would be removed as discussed with regard to sequence 605. However, a lower overall cost is obtained if the PRT at index 9 is removed instead to form a sequence 705 having four PRTs at indices 1, 3, 4, and 7. Similarly, a lower overall cost is obtained in puncturing the PRT at index 4 to form a sequence 710 having three PRTs at indices 1, 3, and 7. In this example, the puncturing of sequence 710 to form a sequence 715 having two PRTs and the puncturing of sequence 715 to form a sequence 720 are performed as discussed for sequences 615 and 620, respectively.

A puncturing process to minimize the total cost across the various rate matched PRT sequences can be represented as:

```
For numTones = 1:N
  Lowest_cost(numTones) = infinity
  best_PRTseq(numTones) = [ ]
  For all ordered PRTseq ⊆ {0, ... , numTones-1} such that |PRTseq|=
  numTones*maxOverHead
    Cost(PRTseq) = 0
    For all subsetLen = {1, . ... , numTones*maxOverHead}
      PRTsubseq = {PRTseq(0), ..., PRTseq(subsetLen-1)}
      Cost_subseq = f_subsetLen (α_PRTsubseq, β_PRTsubseq, γ_PRTsubseq, λ_PRTsubseq)
      Cost(PRTseq) = Cost(PRTseq) + Cost_subseq
    If Cost(PRTseq) < Lowest_cost(numTones)
      best_PRTseq(numTones) = PRTseq
              Lowest_cost(numTones) = Cost(PRTseq)
``` where N represents the maximum number of subcarriers that can be allocated to a UE (e.g., N=3264); maxOverhead represents maximum percentage of PRT overhead (e.g., maxOverhead=0.5); $f_n(\alpha, \beta, \gamma, \lambda)$ is the cost function; numTones represents number of tones for which the PRT sequence is being designed; and best_PRTseq represents the chosen PRT sequence for a maximum overhead of maxOverhead (for lower overhead, this sequence can be truncated). Notably, $f_n(\alpha, \beta, \gamma, \lambda)$ can prioritize a larger n or a smaller n, which allows for a weighted summation of Cost_subseq. For example, for very small overhead (small n), $f_n(\alpha, \beta, \gamma, \lambda)$ can be constrained to avoid saturating the overall cost function.

Figure 8:
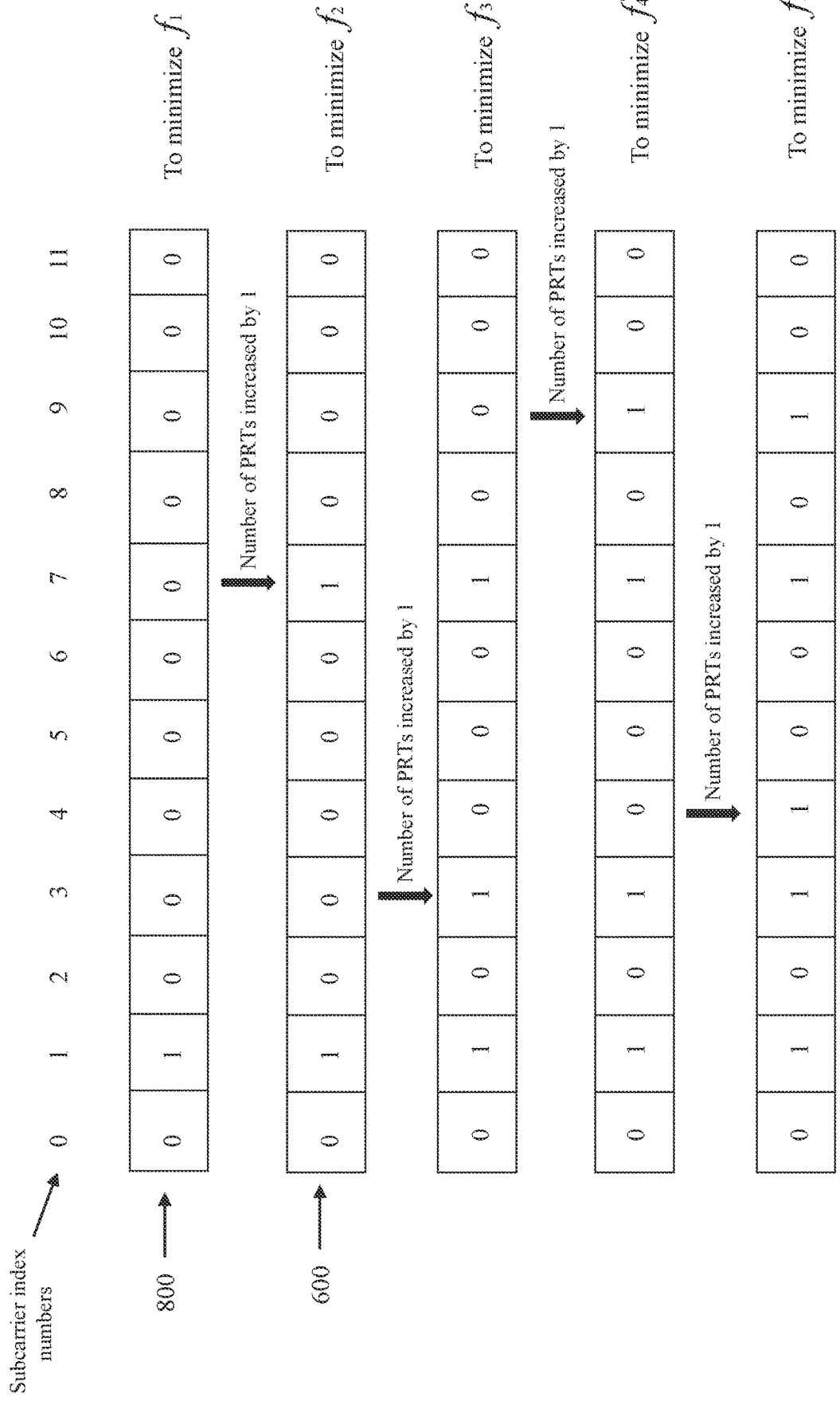
FIG. 8 illustrates a series of sequences of peak reduction tones selected according to adding peak reduction tones to a first sequence of peak reduction tones according to some aspects of the disclosure.

Alternatively, constructing a series of rate matched PRT sequences may be further simplified by starting from the shortest sequence and sequentially adding new PRTs to reach maximum overhead. Such an example is illustrated in FIG. 8. As discussed with regard to FIGS. 6 and 7, the example of FIG. 8 addresses the selection of a series of rate matched PRT sequences from a sequence of 12 transmission tones (one RB), indexed from 0 to 11. The single RB as the set of resources utilized by a transmitter is for illustrative purpose and is non-limiting. As discussed above, for a 100 MHz bandwidth, a transmitter may utilize 272 RBs with 3264 tones (given one RB is one RE wide by 12 subcarriers). In FIG. 8, the frequency domain kernels are again represented with a binary 1 at the indices for PRTs and a binary 0 at the indices used for data.

Still referring to FIG. 8, a communication system may start with the shortest PRT sequence, such as a sequence 800 with n=1, to simplify searching complexity. By exploring the space of possible PRT sequences with n=1, an optimal PRT sequence is identified with a minimum cost function $f_1$ such that sequence 800 has a single PRT at index 1. Subsequently, the process adds an additional PRT to the sequence 800 by adding this additional PRT to the index that minimizes a cost function $f_2$ to form a sequence 805. In sequence 805, the cost is minimized by adding the PRT to index 7. In this fashion, each sequence may be modified successively with an additional PRT so as to minimize corresponding cost functions, which results in additional rate-matched sequences 810, 815, and 820. This successive addition of a PRT to build rate-matched sequences may be performed to minimize the individual cost from going from one sequence to the next or to minimize the overall cost as discussed analogously with regard to sequence 600.

The process of constructing a data-rate-compatible PRT sequence as illustrated in FIG. 8 in which the overall cost is minimized can be represented as:

```
For numTones = 1:N
PRTseq(numTones) = [ ]
Remaining_candidates = {0, ..., numTones - 1}
For numPRT = 1:numTones*maxOverHead
Lowest_cost = infinity
For candidate in Remaining_candidates
        new_PRTseq = [PRTseq, candidate]
        Cost_seq = f _{numPRT} (α_{new_PRTseq}, β_{new_PRTsubseq},
        γ_{new_PRTsubseq}, λ_{new_PRTsubseq})
        If Cost_seq < Lowest_cost
                best_candidate = candidate
                Lowest_cost = Cost_seq
Remaining_candidates = Remaining_candidates \ {best_candidate}
PRTseq(numTones) = [PRTseq, best_candidate]
``` where N represents the maximum number of subcarriers that can be allocated to a UE (e.g., N=3264); maxOverhead represents maximum percentage of PRT overhead (e.g., maxOverhead=0.5); $f_n(\alpha, \beta, \gamma, \lambda)$ is the cost function; and numTones represents number of tones for which the PRT sequence is being designed.

The rate-matched PRT sequences disclosed herein all have the character that, for the same sequence of transmission tones, a rate matched sequence of PRTs having a smaller number n of PRTs is a subset of a rate-matched sequence of PRTs having a larger number n of PRTs. This subset relationship across the rate-matched sequences leads to an efficient storage of the various sequences in a network device that will practice the SCR-TR technique. For example, considering a transmitter utilizing 272 RBs with 3264 tones and a maximum percentage of PRT overhead of 0.5, the sequence having the most PRTs would have 3264*0.5=1632 PRTs (n=1632). A memory storing the rate-matched sequences thus needs only be configured with the indices of the PRTs in the largest sequence along with an order of which PRT is to be punctured from one sequence to the next. Using sequence 600 as punctured as discussed with regard to FIG. 6 as an example, a network device's memory needs only to record $A=[0\ 1_1\ 0\ 1_3\ 1_5\ 0\ 0\ 1_2\ 0\ 1_4\ 0\ 0]$ in the memory, where the subscript identifies the rank (number of PRTs) for the sequence being punctured. Thus, it is the PRT at index 4 that is punctured from going from n=5 to a sequence of 4 PRTs and so on. In this fashion, the memory storage requirements may be reduced accordingly.

In alternative implementations, each rate matched sequence of PRTs may be optimized without regard to any preceding or succeeding sequence. A rate matched sequence having n−1 PRTs in that case would not necessarily be a subset of a rate matched sequence having n PRTs. A wireless device employing the SCR-TR technique must then store the PRT sequence separately for each desired rate matching.

Figure 9:
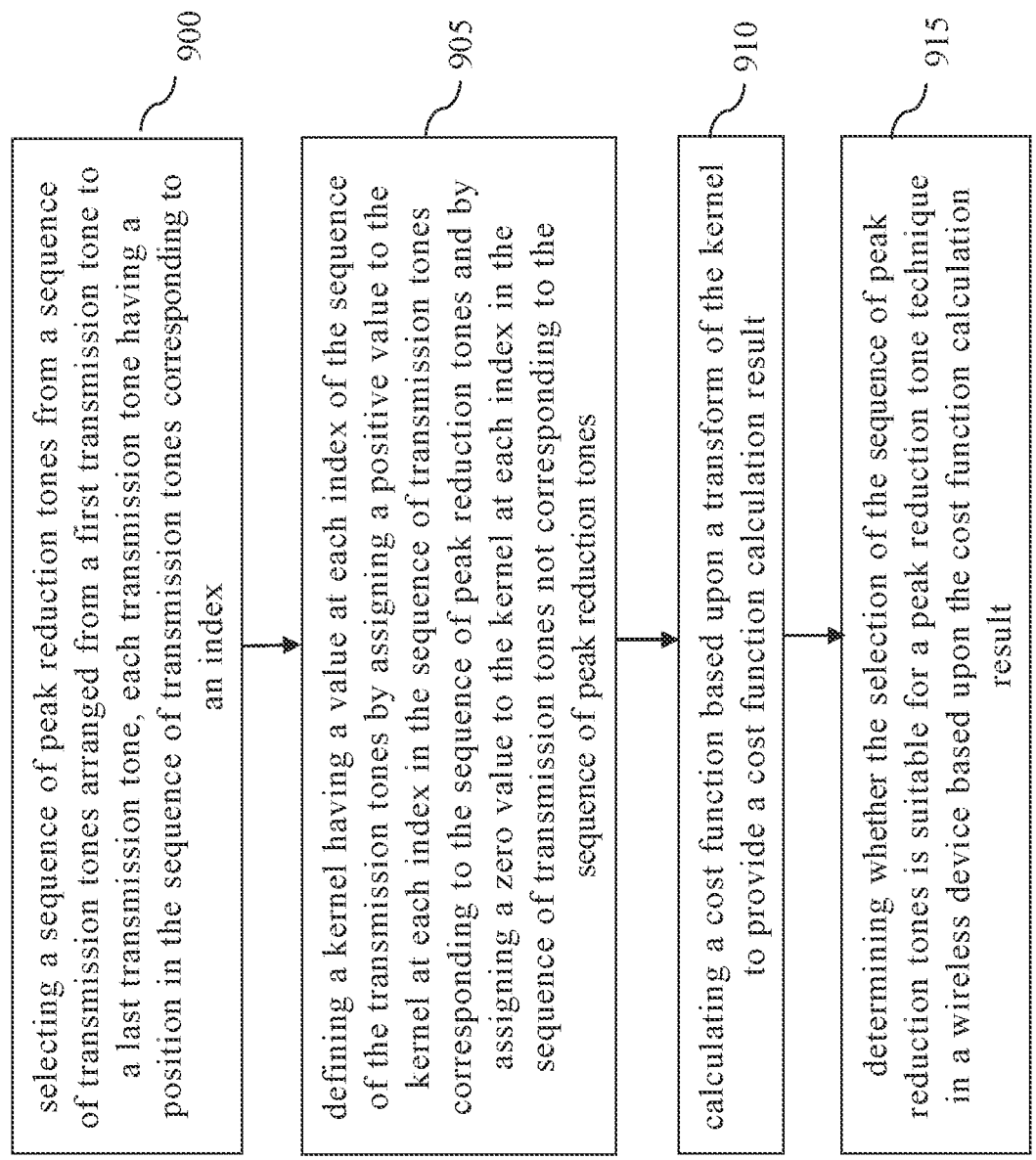
FIG. 9 is a flowchart for a method of selecting peak reduction tones according to some aspects of the disclosure.

The selection of the PRTs using a cost function may be performed offline by a computer such as computer or processor 110 of FIG. 1. A method of selecting a sequence of PRTs using an example computer will now be summarized with reference to the flowchart of FIG. 9. The method includes an act 900 of selecting a sequence of peak reduction tones from a sequence of transmission tones arranged from a first transmission tone to a last transmission tone, each transmission tone having a position in the sequence of transmission tones corresponding to an index. The selection of the peak reduction tones in any one of the sequences of FIGS. 3, 6, 7, and 8 is an example of act 900. This selection may be purely random or may be guided by a suitable algorithm. The method also includes an act 905 of defining a kernel having a value at each index of the sequence of transmission tones by assigning a positive value to the kernel at each index in the sequence of transmission tones corresponding to the sequence of peak reduction tones and by assigning a zero value to the kernel at each index in the sequence of transmission tones not corresponding to the sequence of peak reduction tones. The formation of the kernels of FIGS. 6, 7, and 8 each having either a binary zero or a binary one value at the indices of the sequence of transmission tones as determined by whether there is a peak reduction tone or not at each index is an example of act 905. The method also includes an act 910 of calculating a cost function based upon a transform of the kernel to provide a cost function calculation result. A transform of an example frequency domain kernel (in particular, an IFFT) to form the time domain kernel of FIG. 4 is an example of the transform of the kernel of act 910. Equations (1) and (2) are example cost functions that would then be calculated based upon such a transform of the kernel. Finally, the method includes an act 915 of determining whether the selection of the sequence of peak reduction tones is suitable for a peak reduction tone technique in a wireless device based upon the cost function calculation result. An example of act 915 would be the selection of the PRT sequences discussed with regard to FIGS. 6, 7, and 8 based upon their respective cost functions.

Figure 10:
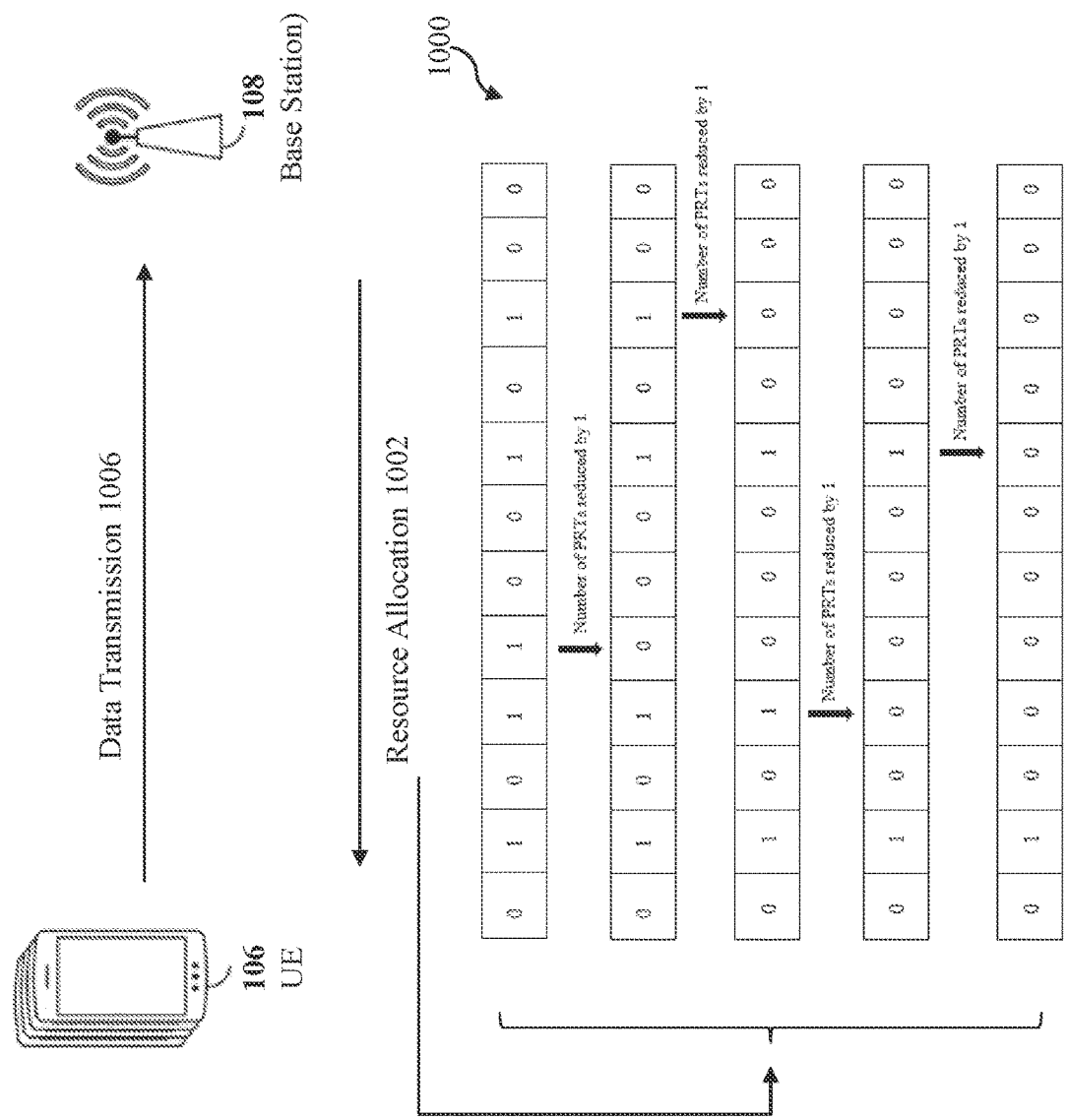
FIG. 10 illustrates a system including a transmitter transmitting to a receiver with a reduced PAPR using peak reduction tones selected according to some aspects of the disclosure.

An example system of a transmitter and receiver in which the transmitter practices SCR-TR PAPR reduction using a rate-matched sequence of peak reduction tones is shown in FIG. 10. In this example, the transmitter is a UE 106 that transmits a transmission 1006 to a receiver (a base station 108). As shown by reference number 1002, the base station 108 may transmit to the UE 106 a resource allocation that specifies the sequence of transmitter tones (e.g., the number of RBs over which UE 106 may transmit). In some aspects, the resource allocation may be carried in downlink control information (DCI), a radio resource control (RRC) message, a medium access control (MAC)-control element (CE), or any other suitable message format. The resource allocation may identify the sequence of transmission tones. Both the UE 106 and base station 108 are configured with a series of rate matched kernels that identify the peak reduction tones for a given data rate as transmitted over the sequence of transmission tones.

Figure 11:
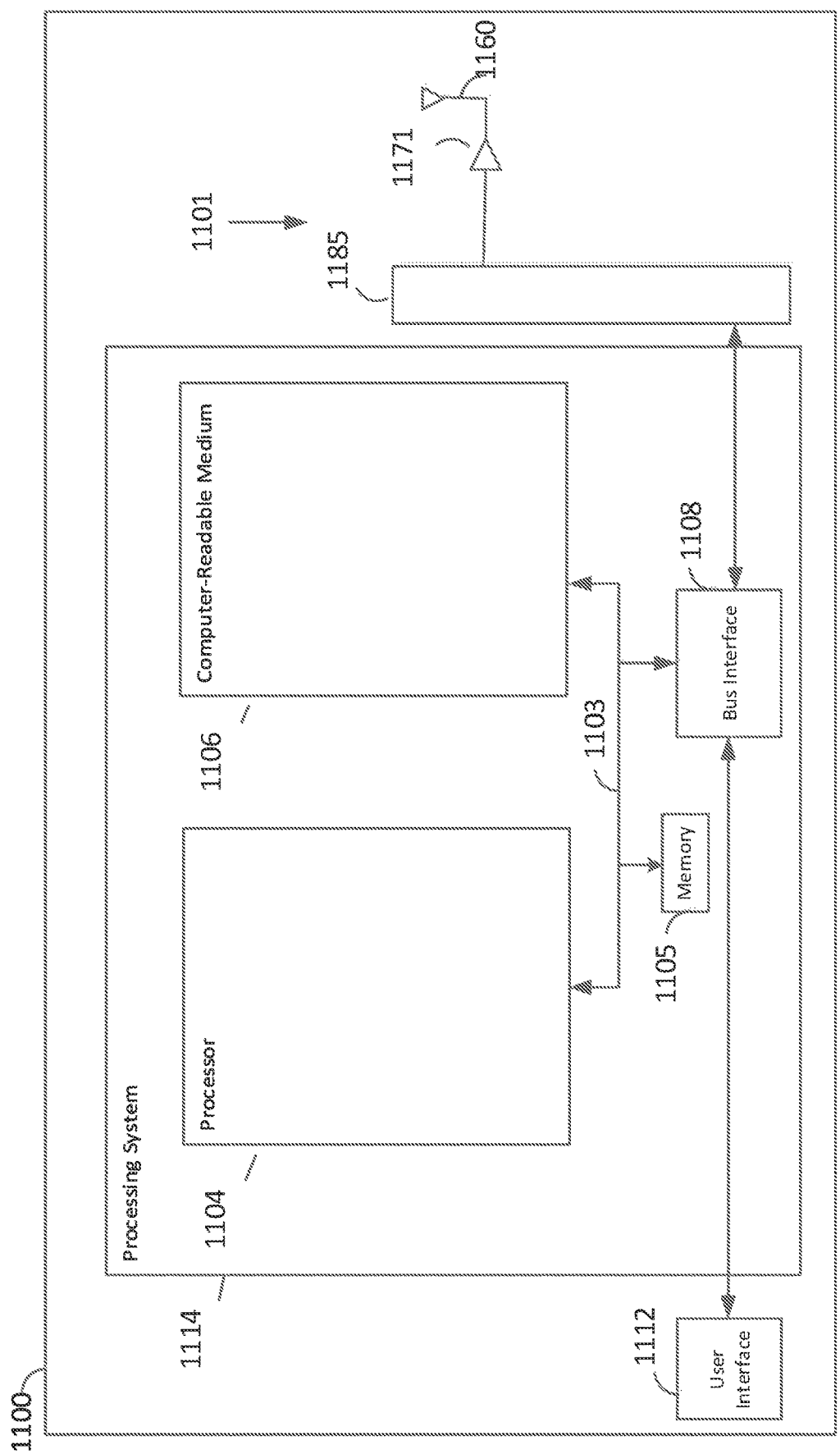
FIG. 11 is a diagram of an example network device configured to transmit a data signal at a reduced PAPR using a sequence of peak reduction tones as selected according to some aspects of the disclosure.

An example network device 1100 with PAPR reduction using a sequence of PRTs as selected herein is shown in more detail in FIG. 11. Network device 1100 may be any suitable device (e.g., a UE or a base station). Network device 1100 includes a processing system 1114 having a bus interface 1108, a bus 1103, a memory 1105, a processor 1104, and a computer-readable medium 1106. Furthermore, network device 1100 may include a user interface 1112 and a transceiver 1101.

Processor 1104 is also responsible for managing the bus 1103 and general processing, including the execution of software stored on the computer-readable medium 1106. The software, when executed by the processor 1104, causes the processor 1104 to control transceiver 1101 to perform PAPR reduction using a PRT sequence such as stored in memory 1105. The bus 1103 may include any number of interconnecting buses and bridges depending on the specific application of the processing system 1114 and the overall design constraints. The bus 1103 communicatively couples together various circuits including one or more processors (represented generally by the processor 1104), the memory 1105, and computer-readable media (represented generally by the computer-readable medium 1106). The bus 1103 may also link various other circuits such as timing sources, peripherals, voltage regulators, and power management circuits, which are well known in the art, and therefore, will not be described any further. The bus interface 1108 provides an interface between the bus 1103 and transceiver 1101.

Transceiver 1101 includes a baseband processor and RF frontend 1185 for converting a digital form of the PAPR-reduced data $x_{new}$ into an RF signal. A power amplifier 1171 (which is shown separately from the RF frontend for illustration purposes) amplifies the RF signal for transmission by an antenna 1160. Transceiver 1101 is configured to combine a first sequence of peak reduction tones and a first sequence of data tones to provide a first sequence of transmission tones forming a first data signal and to transmit the first data signal at a first data rate. Similarly, transceiver 1101 is configured to combine a second sequence of peak reduction tones and a second sequence of data tones to provide a second sequence of transmission tones forming a second data signal, wherein the second sequence of peak reduction tones equals the first sequence of peak reduction tones minus a first peak reduction tone. In addition, transceiver 1101 is configured to transmit the second data signal at a second data rate that is lower than the first data rate. In such an example, the first sequence of peak reduction tones would have some positive integer i of peak reduction tones at corresponding indices of the first sequence of transmission tones. The second sequence of peak reduction tones would have (i−1) peak reduction tones at the same indices as occupied by the first sequence of peak reduction tones except that a single peak reduction tone is deleted such as through the minimization of an individual cost function or the minimization of a sum of cost functions as discussed with regard to FIGS. 6 and 7.

The disclosure will now be summarized in the following example clauses:

Clause 1. A peak reduction tone selection system, comprising:
  a processor configured to:
  select a sequence of peak reduction tones from a sequence of transmission tones arranged from a first transmission tone to a last transmission tone, each transmission tone having a position in the sequence of transmission tones identified by an index;
  define a kernel having a value at each index of the sequence of transmission tones by an assignment of a positive value to the kernel at each index in the sequence of transmission tones corresponding to the sequence of peak reduction tones and by an assignment of a zero value to the kernel at each index in the sequence of transmission tones not corresponding to the sequence of peak reduction tones;
  calculate a cost function of a transform of the kernel to provide a cost function calculation result; and
  determine whether the selection of the sequence of peak reduction tones is suitable for a peak reduction tone technique in a wireless device based upon the cost function calculation result.

Clause 2. The peak reduction tone selection system of clause 1, wherein the processor is further configured to define the kernel such that the assignment of the positive value to each index in the sequence of transmission tones corresponding to the sequence of peak reduction tones is an assignment of a unit positive value.

Clause 3. The peak reduction tone selection system of any of clauses 1-2, wherein the processor is further configured to calculate the cost function based upon one or more factors selected from a width of a main peak of the transform of the kernel, an amplitude of the main peak of the transform of the kernel, an amplitude of a second peak of the transform of the kernel, and a phase-ramp of the transform of the kernel.

Clause 4. The peak reduction tone selection system of clause 3, wherein the cost function is represented as:

$$f_n(\alpha, \beta, \gamma, \lambda) = \frac{\gamma}{\beta} \times \frac{1}{1_{\{\alpha \leq W\}}}$$

wherein n is a positive integer equaling how many peak reduction tones are in the sequence of peak reduction tones, $\alpha$ is the width of the main peak of the transform of the kernel, $\beta$ is the amplitude of the main peak of the transform of the kernel, $\gamma$ is the amplitude of the second peak of the transform of the kernel, $\lambda$ is the phase-ramp, and W is a threshold for the width of the main peak of the transform of the kernel.

Clause 5. The peak reduction tone selection system of clause 3, wherein the cost function can be represented as:

$$f_n(\alpha, \beta, \gamma, \lambda) = \frac{\gamma \alpha}{\beta}$$

wherein n is a positive integer equaling how many peak reduction tones are in the sequence of peak reduction tones, $\alpha$ is the width of the main peak of the transform of the kernel, $\beta$ is the amplitude of the main peak of the transform of the kernel, $\gamma$ is the amplitude of the second peak of the transform of the kernel, and $\lambda$ is the phase-ramp.

Clause 6. The peak reduction tone selection system of claim 3, wherein the cost function can be represented as:

$$f_n(\alpha, \beta, \gamma_{2:n}, \lambda) = \mathrm{var}(\gamma_{2:n})$$

wherein n is a positive integer equaling how many peak reduction tones are in the sequence of peak reduction tones, $\alpha$ is the width of the main peak of the transform of the kernel, $\beta$ is the amplitude of the main peak of the transform of the kernel, $\gamma_{2:n}$ represents amplitudes of the second through $n^{th}$ largest peaks of the transform of the kernel, $\lambda$ is the phase-ramp, and var is a variance.

Clause 7. The peak reduction tone selection system of clause 3, wherein the cost function can be represented as:

$$f_n(\alpha, \beta, \gamma_{2:n}, \lambda) = \frac{\mathrm{var}(\gamma_{2:n})}{\beta}$$

wherein n is a positive integer equaling how many peak reduction tones are in the sequence of peak reduction tones, $\alpha$ is the width of the main peak of the transform of the kernel, $\beta$ is the amplitude of the main peak of the transform of the kernel, $\gamma_{2:n}$ represents amplitudes of the second through $n^{th}$ largest peaks of the transform of the kernel, $\lambda$ is the phase-ramp in time domain of the kernel, and var is a variance.

Clause 8. The peak reduction tone selection system of clause 3, wherein the cost function can be represented as:

$$f_n(\alpha, \beta, \gamma_{2:n}, \lambda) = \frac{\mathrm{var}(\gamma_{2:n}) \times \alpha}{\beta}$$

wherein n is a positive integer equaling how many peak reduction tones are in the sequence of peak reduction tones, $\alpha$ is the width of the main peak of the transform of the kernel, $\beta$ is the amplitude of the main peak of the transform of the kernel, $\gamma_{2:n}$ represents amplitudes of the second through $n^{th}$ largest peaks of the transform of the kernel, λ is the phase-ramp, and var is a variance.

Clause 9. The peak reduction tone selection system of any of clauses 1-8, wherein the transform of the kernel is an inverse fast Fourier transform of the kernel.

Clause 10. The peak reduction tone selection system of any of clauses 1-9, wherein the sequence of peak reduction tones is a first sequence of peak reduction tones for a data transmission at the wireless device at a first data rate, the processor being further configured to:

delete a first peak reduction tone from the first sequence of peak reduction tones to provide a second sequence of peak reduction tones for a data transmission at the wireless device at a second data rate, wherein the second data rate is higher than the first data rate.

Clause 11. The peak reduction tone selection system of clause 10, wherein the processor is further configured to:

delete a second peak reduction tone from the second sequence of peak reduction tones for a data transmission at the wireless device at a third data rate, wherein the third data rate is higher than the second data rate.

Clause 12. The peak reduction tone selection system of clause 11, wherein the processor is further configured to delete the first peak reduction tone based upon a minimization of a first cost function and to delete the second peak reduction tone based upon a minimization of a second cost function.

Clause 13. The peak reduction tone selection system of clause 11, wherein the processor is further configured to delete the first peak reduction tone and to delete the second peak reduction tone based upon a minimization of sum of a first cost function and a second cost function.

Clause 14. A peak reduction tone selection method, comprising:

selecting a sequence of peak reduction tones from a sequence of transmission tones arranged from a first transmission tone to a last transmission tone, each transmission tone having a position in the sequence of transmission tones identified by an index;

defining a kernel having a value at each index of the sequence of transmission tones by assigning a positive value to the kernel at each index in the sequence of transmission tones corresponding to the sequence of peak reduction tones and by assigning a zero value to the kernel at each index in the sequence of transmission tones not corresponding to the sequence of peak reduction tones;

calculating a cost function of a transform of the kernel to provide a cost function calculation result; and determining whether the selection of the sequence of peak reduction tones is suitable for a peak reduction tone technique in a wireless device based upon the cost function calculation result.

Clause 15. The peak reduction tone selection method of clause 14, further comprising:

transforming the kernel according to an inverse Fourier fast transform to form the transform of the kernel.

Clause 16. The peak reduction tone selection method of clause 15, wherein assigning the positive value to the kernel at each index in the sequence of transmission tones corresponding to the sequence of peak reduction tones comprises assigning a unit value to the kernel.

Clause 17. The peak reduction tone selection method of any of clauses 15-16, wherein calculating the cost function of the transform of the kernel comprises calculating the cost function upon one or more factors selected from a width of a main peak of the transform of the kernel, an amplitude of the main peak of the transform of the kernel, an amplitude of a second peak of the transform of the kernel, and a phase-ramp of the transform of the kernel.

Clause 18. A network device, comprising:
a transmitter configured to:
combine a first sequence of peak reduction tones and a first sequence of data tones to provide a first sequence of transmission tones forming a first data signal;
transmit the first data signal at a first data rate;
combine a second sequence of peak reduction tones and a second sequence of data tones to provide a second sequence of transmission tones forming a second data signal, wherein the second sequence of peak reduction tones equals the first sequence of peak reduction tones minus a first peak reduction tone; and
transmit the second data signal at a second data rate that is lower than the first data rate.

Clause 19. The network device of clause 18, wherein the transmitter is further configured to:
combine a third sequence of peak reduction tones and a third sequence of data tones to provide a third sequence of transmission tones forming a third data signal, wherein the third sequence of peak reduction tones equals the second sequence of peak reduction tones minus a second peak reduction tone; and
transmit the third data signal at a third data rate that is lower than the second data rate.

Clause 20. The network device of clause 18, wherein the second sequence of transmission tones extends across a same number of resource blocks as extended across by the first sequence of transmission tones.

Clause 21. The network device of clause 20, wherein the network device is a user equipment.

The description set forth herein, in connection with the appended drawings, describes example configurations and does not represent all the examples that may be implemented or that are within the scope of the claims. The detailed description includes specific details for the purpose of providing an understanding of the described techniques. These techniques, however, may be practiced without these specific details. In some instances, well-known structures and devices are shown in block diagram form in order to avoid obscuring the concepts of the described examples. The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A peak reduction tone selection system, comprising:
a processor configured to:
select a sequence of peak reduction tones from a sequence of transmission tones, each transmission tone having an order in the sequence of transmission tones identified by an index;
define a kernel having a value at each index of the sequence of transmission tones by an assignment of a positive value to the kernel at each index in the sequence of transmission tones corresponding to the sequence of peak reduction tones and by an assignment of a zero value to the kernel at each index in the sequence of transmission tones not corresponding to the sequence of peak reduction tones;

calculate a cost function of a transform of the kernel to provide a cost function calculation result; and determine whether the selection of the sequence of peak reduction tones is suitable for a peak reduction tone technique in a wireless device based upon the cost function calculation result.

2. The peak reduction tone selection system of claim 1, wherein the processor is further configured to define the kernel such that the assignment of the positive value to each index in the sequence of transmission tones corresponding to the sequence of peak reduction tones is an assignment of a unit positive value.

3. The peak reduction tone selection system of claim 1, wherein the processor is further configured to calculate the cost function based upon one or more factors selected from a width of a main peak of the transform of the kernel, an amplitude of the main peak of the transform of the kernel, an amplitude of a second peak of the transform of the kernel, and a phase-ramp of the transform of the kernel.

4. The peak reduction tone selection system of claim 3, wherein the cost function is represented as:

$$f_n(\alpha, \beta, \gamma, \lambda) = \frac{\gamma}{\beta} \times \frac{1}{1_{\{\alpha \leq W\}}}$$

wherein n is a positive integer equaling how many peak reduction tones are in the sequence of peak reduction tones, $\alpha$ is the width of the main peak of the transform of the kernel, $\beta$ is the amplitude of the main peak of the transform of the kernel, $\gamma$ is the amplitude of the second peak of the transform of the kernel, $\lambda$ is the phase-ramp, and W is a threshold for the width of the main peak of the transform of the kernel.

5. The peak reduction tone selection system of claim 3, wherein the cost function can be represented as:

$$f_n(\alpha, \beta, \gamma, \lambda) = \frac{\gamma \alpha}{\beta}$$

wherein n is a positive integer equaling how many peak reduction tones are in the sequence of peak reduction tones, $\alpha$ is the width of the main peak of the transform of the kernel, $\beta$ is the amplitude of the main peak of the transform of the kernel, $\gamma$ is the amplitude of the second peak of the transform of the kernel, and $\lambda$ is the phase-ramp.

6. The peak reduction tone selection system of claim 3, wherein the cost function can be represented as:

$$f_n(\alpha, \beta, \gamma_{2:n}, \lambda) = \text{var}(\gamma_{2:n})$$

wherein n is a positive integer equaling how many peak reduction tones are in the sequence of peak reduction tones, $\alpha$ is the width of the main peak of the transform of the kernel, $\beta$ is the amplitude of the main peak of the transform of the kernel, $\gamma_{2:n}$ represents amplitudes of the second through $n^{th}$ largest peaks of the transform of the kernel, $\lambda$ is the phase-ramp, and var is a variance.

7. The peak reduction tone selection system of claim 3, wherein the cost function can be represented as:

$$f_n(\alpha, \beta, \gamma_{2:n}, \lambda) = \frac{\text{var}(\gamma_{2:n})}{\beta}$$

wherein n is a positive integer equaling how many peak reduction tones are in the sequence of peak reduction tones, $\alpha$ is the width of the main peak of the transform of the kernel, $\beta$ is the amplitude of the main peak of the transform of the kernel, $\gamma_{2:n}$ represents amplitudes of the second through $n^{th}$ largest peaks of the transform of the kernel, $\lambda$ is the phase-ramp in time domain of the kernel, and var is a variance.

8. The peak reduction tone selection system of claim 3, wherein the cost function can be represented as:

$$f_n(\alpha, \beta, \gamma_{2:n}, \lambda) = \frac{\text{var}(\gamma_{2:n}) \times \alpha}{\beta}$$

wherein n is a positive integer equaling how many peak reduction tones are in the sequence of peak reduction tones, $\alpha$ is the width of the main peak of the transform of the kernel, $\beta$ is the amplitude of the main peak of the transform of the kernel, $\gamma_{2:n}$ represents amplitudes of the second through $n^{th}$ largest peaks of the transform of the kernel, $\lambda$ is the phase-ramp, and var is a variance.

9. The peak reduction tone selection system of claim 1, wherein the transform of the kernel is an inverse fast Fourier transform of the kernel.

10. The peak reduction tone selection system of claim 1, wherein the sequence of peak reduction tones is a first sequence of peak reduction tones for a data transmission at the wireless device at a first data rate, the processor being further configured to:

delete a first peak reduction tone from the first sequence of peak reduction tones to provide a second sequence of peak reduction tones for a data transmission at the wireless device at a second data rate, wherein the second data rate is higher than the first data rate.

11. The peak reduction tone selection system of claim 10, wherein the processor is further configured to:

delete a second peak reduction tone from the second sequence of peak reduction tones for a data transmission at the wireless device at a third data rate, wherein the third data rate is higher than the second data rate.

12. The peak reduction tone selection system of claim 11, wherein the processor is further configured to delete the first peak reduction tone based upon a minimization of a first cost function and to delete the second peak reduction tone based upon a minimization of a second cost function.

13. The peak reduction tone selection system of claim 11, wherein the processor is further configured to delete the first peak reduction tone and to delete the second peak reduction tone based upon a minimization of sum of a first cost function and a second cost function.

14. A peak reduction tone selection method, comprising:

selecting a sequence of peak reduction tones from a sequence of transmission tones arranged from a first transmission tone to a last transmission tone, each transmission tone having a position in the sequence of transmission tones identified by an index;

defining a kernel having a value at each index of the sequence of transmission tones by assigning a positive value to the kernel at each index in the sequence of transmission tones corresponding to the sequence of peak reduction tones and by assigning a zero value to the kernel at each index in the sequence of transmission tones not corresponding to the sequence of peak reduction tones;

calculating a cost function of a transform of the kernel to provide a cost function calculation result; and determining whether the selection of the sequence of peak reduction tones is suitable for a peak reduction tone technique in a wireless device based upon the cost function calculation result.

15. The peak reduction tone selection method of claim 14, further comprising:

transforming the kernel according to an inverse Fourier fast transform to form the transform of the kernel.

16. The peak reduction tone selection method of claim 15, wherein assigning the positive value to the kernel at each index in the sequence of transmission tones corresponding to the sequence of peak reduction tones comprises assigning a unit value to the kernel.

17. The peak reduction tone selection method of claim 15, wherein calculating the cost function of the transform of the kernel comprises calculating the cost function upon one or more factors selected from a width of a main peak of the transform of the kernel, an amplitude of the main peak of the transform of the kernel, an amplitude of a second peak of the transform of the kernel, and a phase-ramp of the transform of the kernel.

18. A network device, comprising:

a transmitter configured to:

combine a first sequence of peak reduction tones and a first sequence of data tones to provide a first sequence of transmission tones forming a first data signal;

transmit the first data signal at a first data rate;

combine a second sequence of peak reduction tones and a second sequence of data tones to provide a second sequence of transmission tones forming a second data signal, wherein the second sequence of peak reduction tones equals the first sequence of peak reduction tones minus a first peak reduction tone; and transmit the second data signal at a second data rate that is lower than the first data rate.

19. The network device of claim 18, wherein the transmitter is further configured to:

combine a third sequence of peak reduction tones and a third sequence of data tones to provide a third sequence of transmission tones forming a third data signal, wherein the third sequence of peak reduction tones equals the second sequence of peak reduction tones minus a second peak reduction tone; and transmit the third data signal at a third data rate that is lower than the second data rate.

20. The network device of claim 18, wherein the second sequence of transmission tones extends across a same number of resource blocks as extended across by the first sequence of transmission tones.

21. The network device of claim 20, wherein the network device is a user equipment.

* * * * *